United States Patent
Maruyama et al.

(10) Patent No.: US 10,351,084 B2
(45) Date of Patent: Jul. 16, 2019

(54) POWER SUPPLY CONTROL SYSTEM

(71) Applicant: YAZAKI CORPORATION, Tokyo (JP)

(72) Inventors: Akinori Maruyama, Shizuoka (JP); Shuuji Satake, Shizuoka (JP); Satoshi Morita, Shizuoka (JP); Yoshinori Ikuta, Shizuoka (JP); Yoshihide Nakamura, Shizuoka (JP); Yasuyuki Shigezane, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 429 days.

(21) Appl. No.: 15/391,357

(22) Filed: Dec. 27, 2016

(65) Prior Publication Data
US 2017/0106820 A1  Apr. 20, 2017

Related U.S. Application Data

(63) Continuation of application No. PCT/JP2015/070252, filed on Jul. 15, 2015.

(30) Foreign Application Priority Data

Jul. 15, 2014 (JP) .................................. 2014-145177
Sep. 5, 2014 (JP) .................................. 2014-180904
Jan. 9, 2015 (JP) .................................. 2015-002813

(51) Int. Cl.
| | |
|---|---|
| *H01H 83/00* | (2006.01) |
| *H01H 35/00* | (2006.01) |
| *H01H 47/00* | (2006.01) |
| *B60R 16/033* | (2006.01) |
| *B60R 16/03* | (2006.01) |

(52) U.S. Cl.
CPC ............ *B60R 16/033* (2013.01); *B60R 16/03* (2013.01)

(58) Field of Classification Search
CPC .............................. B60R 16/03; B60R 16/033
(Continued)

(56) References Cited

U.S. PATENT DOCUMENTS

| 8,078,331 B2 | 12/2011 | Sakane | |
|---|---|---|---|
| 2006/0276947 A1* | 12/2006 | Kaita | ................... H01H 47/002 701/48 |

(Continued)

FOREIGN PATENT DOCUMENTS

| CN | 103154759 A | 6/2013 |
|---|---|---|
| CN | 105722728 A | 6/2016 |

(Continued)

OTHER PUBLICATIONS

A Japanese Office action dated Jun. 6, 2017 in the counterpart Japanese patent application, JP2015-002813.
A Japanese Office action dated Jun. 6, 2017 in the counterpart Japanese patent application, JP2014-145177.
An office action dated Jun. 26, 2018 in a counterpart Chinese patent application.

(Continued)

*Primary Examiner* — Rexford N Barnie
*Assistant Examiner* — Toan T Vu
(74) *Attorney, Agent, or Firm* — Metrolexis Law Group, PLLC

(57) ABSTRACT

When an anomaly is determined in the transition of ECUs to a power saving state, a power supply control system sequentially turns on current supply switches while keeping a bypass switch on. A monitoring controller determines an anomaly in the transition of the ECUs to a power saving state on the basis of whether the dark current in the ECUs calculated from the amount of change at that time in the current in the power supply line is greater than an ordinary dark current. Further, in the startup state of the ECUs, power from a power supply can be supplied to the ECUs via the power supply line and individual supply lines.

2 Claims, 25 Drawing Sheets

(58) Field of Classification Search
USPC .......................................................... 307/131
See application file for complete search history.

(56) References Cited

U.S. PATENT DOCUMENTS

| | | |
|---|---|---|
| 2009/0082909 A1 | 3/2009 | Sakane |
| 2013/0200699 A1* | 8/2013 | Origane .................. B60R 16/03 |
| | | 307/10.6 |
| 2013/0200902 A1 | 8/2013 | Kurimoto |
| 2016/0248262 A1 | 8/2016 | Maruyama |

FOREIGN PATENT DOCUMENTS

| | | |
|---|---|---|
| JP | H9-261801 A | 10/1997 |
| JP | H10-27009 A | 1/1998 |
| JP | 2007-203929 A | 8/2007 |
| JP | 2007-237868 A | 9/2007 |
| JP | 2009-081948 A | 4/2009 |
| JP | 2009-292330 A | 12/2009 |
| JP | 2009-292333 A | 12/2009 |
| WO | 2012/049852 A1 | 4/2012 |

OTHER PUBLICATIONS

An office action dated Dec. 20, 2017 in a counterpart Japanese patent application.
An office action dated Jan. 9, 2018 in a counterpart Japanese patent application.

* cited by examiner

FIG. 12

ON/OFF State of Each SW at Detection of
Dark-Current Anomaly Route

|  | SW0 | SW1 | SW2 | SW3 |
|---|---|---|---|---|
| Route #1 | ON | OFF | ON | ON |
| Route #2 | ON | ON | OFF | ON |
| Route #3 | ON | ON | ON | OFF |

FIG. 13

ON/OFF State of Each SW at Power-On Reset

|  | SW0 | SW1 | SW2 | SW3 |
|---|---|---|---|---|
| Route #1 | OFF | OFF | ON | ON |
| Route #2 | OFF | ON | OFF | ON |
| Route #3 | OFF | ON | ON | OFF |

FIG. 25

|  | 1st Power Supply Unit | | | | 2nd Power Supply Unit | | | |
|---|---|---|---|---|---|---|---|---|
|  | SW0 | SW1 | SW2 | SW3 | SW0 | SW1 | SW2 | SW3 |
| ECU1 | ON | OFF | ON | ON | OFF | ON | ON | OFF |
| ECU2 | ON | ON | ON | OFF | – | – | – | – |
| ECU3 | – | – | – | – | ON | OFF | ON | ON |
| ECU4 | ON | ON | OFF | ON | OFF | ON | OFF | ON |

FIG. 26

|  | 1st Power Supply Unit | | | | 2nd Power Supply Unit | | | |
|---|---|---|---|---|---|---|---|---|
|  | SW0 | SW1 | SW2 | SW3 | SW0 | SW1 | SW2 | SW3 |
| ECU1 | OFF | OFF | ON | ON | OFF | ON | ON | OFF |
| ECU2 | OFF | ON | ON | OFF | – | – | – | – |
| ECU3 | – | – | – | – | OFF | OFF | ON | ON |
| ECU4 | OFF | ON | OFF | ON | OFF | ON | OFF | ON |

FIG. 27

ON/OFF State of Each SW at Detection
of Dark-Current Anomaly Route

|  | SW0 | SW1 | SW2 | SW3 |
|---|---|---|---|---|
| Route #1 | ON | OFF | ON | ON |
| Route #2 | ON | ON | OFF | ON |
| Route #3 | ON | ON | ON | OFF |

FIG. 28

ON/OFF State of Each SW at Power-On Reset

|  | SW0 | SW1 | SW2 | SW3 |
|---|---|---|---|---|
| Route #1 | OFF | OFF | ON | ON |
| Route #2 | OFF | ON | OFF | ON |
| Route #3 | OFF | ON | ON | OFF |

POWER SUPPLY CONTROL SYSTEM

CROSS REFERENCE TO RELATED APPLICATIONS

This application is a continuation of International Application No. PCT/JP2015/070252, filed Jul. 15, 2015, and based upon and claims the benefit of priority from Japanese Patent Applications No. 2014-145177, filed Jul. 15, 2014, No. 2014-180904, filed Sep. 5, 2014, and No. 2015-002813, filed Jan. 9, 2015, the entire contents of all of which are incorporated herein by reference.

TECHNICAL FIELD

The present application relates to a power supply control system which controls supplying power from a power supply to a load with use of a controller.

BACKGROUND ART

A vehicle is equipped with a controller called to as electronic control unit (ECU). Detecting the states of a switch or an output of a sensor on the vehicle, the ECU controls supplying power from a power supply to a load (electric component) corresponding to the switch, the sensor, or the like in accordance with the above detecting result. As numerous loads, switches, sensors, and the like are usually mounted on a vehicle, it is also equipped with a plurality of ECUs correspondingly.

In a vehicle, meanwhile, there is performed a control where a power supply line connected to a power supply is interrupted if a current flowing through the power supply line exceeds a threshold value, by a monitoring unit for monitoring power supply systems as a whole. By this control, it is possible to prevent the occurrence of an overcurrent state on a route for supplying a power of the power supply, thereby preventing an electric wire from being damaged. The threshold value for this control is established on the basis of a maximum current flowing through the power supply line. Further, if the power supply line is provided for respective ECUs, then the maximum current for the power supply line is determined on the basis of the sum of respective currents flowing through the respective ECUs.

Here, there is a situation where the power supply control of an ECU for a load becomes unnecessary depending on the condition of a vehicle, for example, the position of an ignition switch. Therefore, when the power supply control for the load is unnecessary with respect to all objects to be controlled, it is possible for the ECU to make the transition of its own operating condition from a startup state (wake state) to a power saving state (sleep state) in view of power saving.

As for a power that an ECU does consume, there is a difference in between the startup state and the power saving state. An ECU in the power saving state consumes a power less than the ECU in the startup state. Therefore, by checking whether or not the magnitude of a current flowing through the power supply line against an ECU actually is a value compatible to the fundamental and original state for the ECU, it is possible to detect an anomaly that the ECU still remains in the startup state despite of being supposed to be in the power saving state.

However, a current flowing through the power supply line when an ECU is in the power saving state is originally smaller than a current flowing when the ECU is in the startup state due to reduction in number of loads supplied with power under the control of ECUs. Therefore, only with the occurrence of an anomaly that an ECU supposed to make the transition to the power saving state has not made the transition to the power saving state yet, the current flowing through the power supply line does not produced such a variation as to exceed a threshold value suitable to detect an overcurrent condition when the ECU is in the startup state.

Thus, for instance, in a case of monitoring the occurrence of an overcurrent condition when an ECU is in the startup state and also the occurrence of an anomaly of the ECU when it is supposed to be in the power saving state, when the ECU is in the power saving state, it is necessary to switch the threshold value used for the comparison with the current flowing through the power supply line to a lower value than the threshold value when the ECU is in the startup state.

Therefore, there is proposed a technique where each ECU of a vehicle makes a declaration of operating condition of its own to the monitoring unit through a communication periodically, while the monitoring unit renews the threshold value on the ground of the declaration periodically (refer to JP 2009-081948 A). According to this proposal, it is possible to switch the threshold value of the monitoring unit corresponding to the operating condition of the ECU.

Then, by switching the threshold value and also providing the monitoring unit for monitoring the current flowing through the power supply line, it is possible to detect an anomaly, which may be caused under condition that a current flowing through the power supply line is smaller than a current in case of an anomaly where an overcurrent state arises in an ECU in a startup state, for example, such an anomaly that an ECU does not change from its startup state to the power saving state.

The capability to detect such an anomaly enables an ECU, which is supposed to change to the power saving state by e.g. turning off an ignition switch, to be interrupted from a power supply in advance of such a situation that, if the ECU keeps its clock operation under the startup state due to program runaway etc., a power of the power supply incapable of being charged due to an engine stopping would be consumed by the ECU uselessly. This is a remarkably effective measure in view of avoiding the occurrence of a situation where an engine cannot be started by a starter due to battery exhaustion.

SUMMARY

Meanwhile, in the conventional proposal mentioned above, respective ECUs have to be communicatable with the monitoring unit in order to allow the respective ECUs to self-report their operating conditions to the monitoring unit. Therefore, to reflect the operating conditions of the ECUs on threshold values used for the power-interruption control of the power supply line, it is necessary for the ECUs to have communicating functions with the monitoring unit, thereby causing the constitution of a system to be complicated.

In consideration of the above-mentioned situation, an object of the present application is to provide a power supply control system which is capable of judging, with its simple constitution, an anomaly where, despite that a controller for controlling supplying power to a load, such as an ECU, should be changed from its startup state (WAKE state) to the power saving state (SLEEP state), the controller does not change to the power saving state by errors but still remains in the startup state.

In order to attain the above object, there a power supply control system according to the present application is for a controller for controlling supplying a power from a power supply to a load, and includes: a power supply line which is connected to the power supply and through which a current flows with supplying the power to the controller; a bypass switch which is arranged on the power supply line and which allows supplying the power from the power supply line to the controller to be interrupted by turning-off of the bypass switch; a current measuring unit which is provided on the power supply line to be closer to the controller than the bypass switch and which can measure a current flowing through the power supply line during turning-on of the bypass switch with use of a shunt resistor; a current supply line which is branched from the power supply line between the power supply and the bypass switch and which is connected to the controller to form a circuit in parallel with the bypass switch and the shunt resistor; a current supply switch which is provided on the current supply line and which allows supplying the power from the current supply line to the controller to be interrupted by turning-off of the current supply switch; and an anomaly judgment unit configured, in a system-off mode where the controller is to make the transition to a power saving state after stopping supplying the power to the load, so as to judge an anomaly in the transition of the controller to the power saving state from a variation of the current that the current measuring unit measures when turning on or off the current supply switch while keeping the turning-on of the bypass switch, the controller being connected to the current supply line including the current supply switch.

With the above-mentioned constitution, in a system-off mode where the controller is to make the transition to a power saving state after stopping supplying the power to the load, when judging whether or not there exists an anomaly in the transition of the controller to the power saving state, the current supply switch is turned on while keeping the turning-on of the bypass switch.

Then, as the current supply line is smaller in resistance than the power supply line interposing the shunt resistor, the current for the controller will flow through the current supply line exclusively. In other words, although the supply of a dark current to the controller in the power saving state is still continued, the supply route is switched from the power supply line to the current supply line. As a result, the current flowing through the power supply line is decreased as the dark current for the controller disappears with the change of the supply route.

Therefore, by observing a variation of current of the power supply line that the current measuring unit detects when turning on the current supply switch while keeping the bypass switch on, it is possible to grasp a current lowing through the controller. Additionally, by verifying whether or not the grasped current is larger than the magnitude of an ordinary dark current, the anomaly judging unit can judge presence or absence of an anomaly in the transition of the controller to the power saving state.

Further, when the controller is in the startup state to control supplying the power to the load, it is possible to supply the power of a power supply to the controller through the power supply line.

Therefore, even if the controller is not equipped with a communicating function of informing whether its own state is the power saving state or the startup state, it is possible to judge presence or absence of an anomaly in the transition of the controller to the power saving state by a current of the power supply line, which is detected when the controller is supposed to be in the power saving state on control.

Thus, it is possible to perform the judgment of an anomaly where the controller does not make the transition to the power saving state but still remains the startup state despite that the controller for controlling supplying the power to the load should be changed from the startup state to the power saving state, with a simple structure.

Additionally, since there is no need of measuring a current flowing through the current supply line in addition to the current flowing through the power supply line, it is possible to prevent the circuitry of the current measuring system from being complicated to cause an increase in power consumption of the current measuring system.

In the power supply control system according to the aspect of the present application, there may be provided a plurality of controllers for the controller and plural sets of combinations each including the current supply line and the current supply switch, corresponding to the controllers, and additionally, the anomaly judgment unit may be configured so as to sequentially judge, in the system-off mode, anomaly in the transition of the controllers to the power saving state by sequentially turning on the current supply switches in respective sets while keeping the turning-on of the bypass switch.

With the above-mentioned constitution, if there exists the plurality of controllers, the power supply control system is configured so that the sets of the current supply lines and the current supply switches corresponding to the controllers can supply dark currents through different routes from the power supply route. In the system-off mode, additionally, by sequentially turning on the respective current supply switches during the turning-on of the bypass switch, it is possible to judge the anomaly in the transition of the respective controllers to the power saving state, individually.

With the power supply control system according to the aspect of the present application, it is possible to perform the judgment of an anomaly where a controller, such as an ECU, does not make the transition to the power saving state by errors but still remains the startup state despite that the controller for controlling supplying the power to the load should be changed from the startup state (wake state) to the power saving state (sleep state), with a simple structure.

BRIEF DESCRIPTION OF DRAWINGS

FIG. 12 is a table illustrating ON and OFF states of respective switches at the detection of a dark-current anomaly in the power supply control system according to the second embodiment.

FIG. 13 is a table illustrating ON and OFF states of respective switches at the power-on reset in the power supply control system according to the second embodiment.

FIG. 25 is a table illustrating ON and OFF states of respective switches at the measurement of a dark current in the power supply control system according to the fourth embodiment.

FIG. 26 is a table illustrating ON and OFF states of respective switches at the power-on reset in the power supply control system according to the fourth embodiment.

FIG. 27 is a table illustrating ON and OFF states of respective switches at the detection of a dark-current anomaly in the dark-current anomaly route detecting process.

FIG. 28 is a table illustrating ON and OFF states of respective switches at the power-on reset in the power-on reset process.

DESCRIPTION OF EMBODIMENTS

First Embodiment

Figure 1:
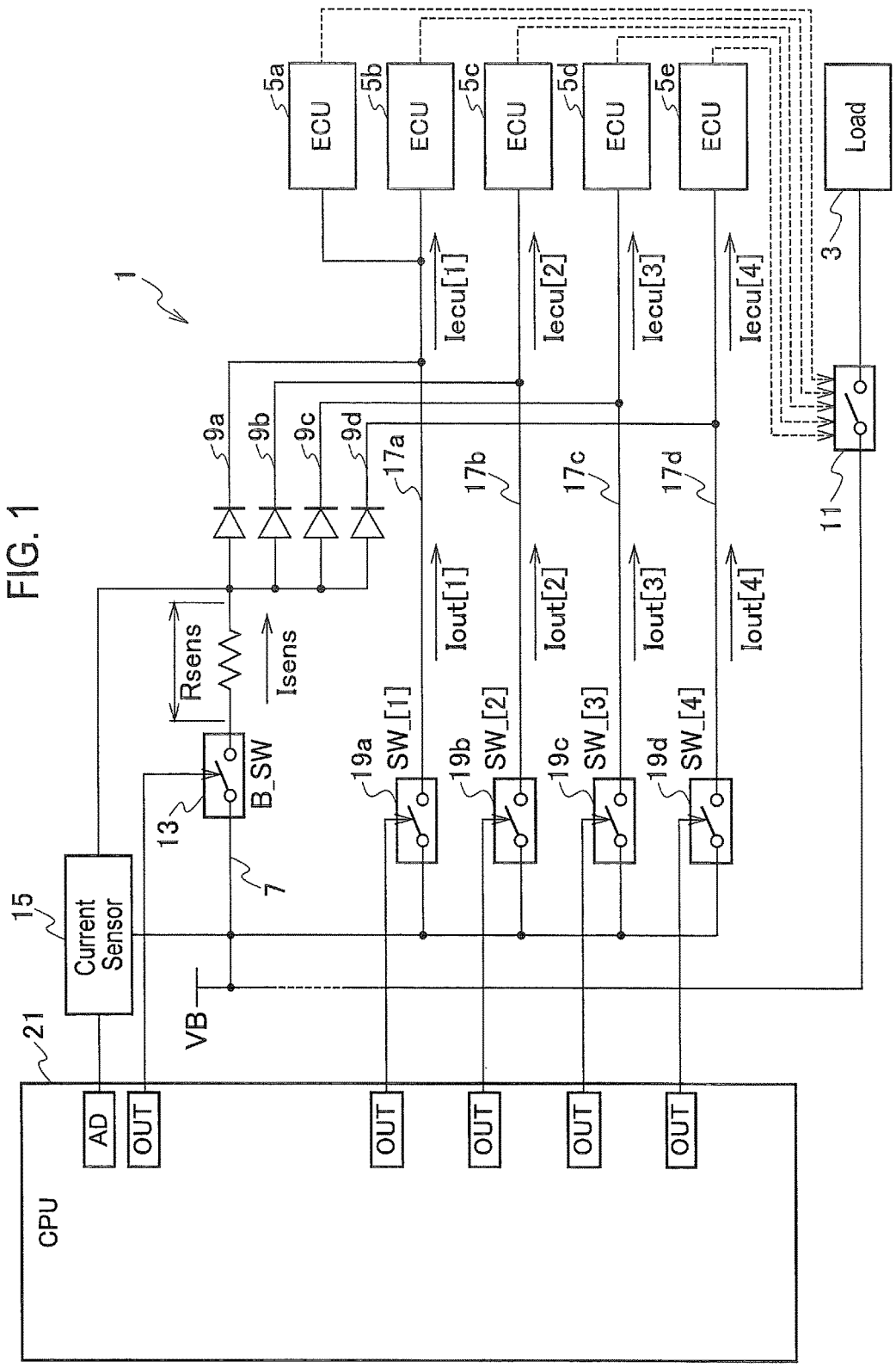
FIG. 1 is a circuit diagram illustrating the schematic constitution of a power supply circuit of a vehicle on application of a power supply control system according to a first embodiment.

A first embodiment will be described with reference to FIGS. 1 to 6.

A power supply control system 1 according to the first embodiment is a system which is mounted on a vehicle (not illustrated) to control supplying power from a power supply VB to a load 3. Although the load 3 is illustrated in the form of a single component in FIG. 1, there exist multiple loads actually.

The power supply control system 1 includes electronic control units (ECUs) 5a-5e, a power supply line 7, individual supply lines 9a-9d, a switch 11, a bypass switch 13, a current sensor 15, current supply lines 17a-17d, current supply switches 19a-19d, and a monitoring controller 21 as an anomaly judgment unit.

In the power control system 1 according to the first embodiment, supplying the power to respective loads 3 is controlled by the ECU 5a-5e as controllers corresponding to the respective loads 3.

The power supply VB is a battery mounted on the vehicle (not illustrated). A power of the power supply VB is supplied to the respective ECUs 5a-5e through the power supply line 7 connected to the power supply VB and the individual supply lines 9a-9d of the downstream side of the line 7. The power of the power supply VB is also supplied to the loads 3 through different routes from the respective ECUs 5a-5e.

xtending from the power supply VB toward the loads 3, there are the switches 11 for power supply control, which are turned on and off by the ECUs 5a-5e corresponding to the loads 3.

To each ECU 5a-5e, there are connected various sensors (not illustrated) and switches (not illustrated). Depending on the states of these connected components, each ECU5a-5e turns on and off the switch 11 interposed in the power supply route for the corresponding load 3. An ignition switch is also included in the switches (not illustrated).

If supplying the power to the load 3 corresponding to the sensors and the switches is controlled by the other ECU 5a-5e, data indicating the states of the sensors and the switches is transferred among the ECUs 5a-5e through an in-vehicle LAN, for example, CAN (Control Area Network) built in the vehicle.

The bypass switch 13 is provided on the power supply line 7 to stop supplying the power fed from the power supply VB to the respective ECUs 5a-5e through the individual supply lines 9a-9d. Further, a shunt resistor Rsens is arranged between the bypass switch 13 in the power supply line 7 and a branch point of the individual supply lines 9a-9d. The current sensor 15 as a current measuring unit is connected to both ends of the shunt resistor Rsens interposing the bypass switch 13. The current sensor 15 measures a current flowing through the power supply line 7 from a voltage drop at the shunt resistor Rsens.

The current supply lines 17a-17d are branch-connected to a certain point of the power supply line 7 between the power supply VB and the bypass switch 13. The current supply lines 17a-17d are connected to the ECUs 5b-5e, respectively and individually. That is, the current supply lines 17a-17d are connected in parallel with series circuits including the power supply line 7, the bypass switch 13, the shunt resistor Rsens, and the individual supply lines 9a-9d.

The ECU 5a is branch-connected to the current supply line 17a connected to the ECU 5b. In the ECU 5a, its conditions of making the transition to the startup state (wake state) and the power saving state (sleep state) are the same as those of the ECU 5b. The current supply switches 19a-19d are provided on the current supply lines 17a-17d, respectively.

In the power supply line 7, the bypass switch 13 is usually in an ON state. Thus, the power of the power supply VB is supplied to the respective ECUs 5a-5e through the power supply line 7 and the individual supply lines 9a-9d. In the startup state, each ECU 5a-5e supplied with the power of the power supply VB controls to supply the power to the load 3, depending on the states of the sensors (not illustrated) and the switches (not illustrated). Each ECU 5a-5e makes the transition to the power saving state when it is stopping to supply the power to the corresponding load 3. Each ECU 5a-5e completing the transition to the power saving state returns to the startup state when the states of the sensors (not illustrated) and the switches (not illustrated) do vary.

When the ECUs 5a-5e are in the startup state, the bypass switch 13 is brought into an ON state under the control of the monitoring controller 21. Meanwhile, in the system-off mode where the ECUs 5a-5e are all in the power saving state, the bypass switch 13 is switched to an OFF state under the control of the monitoring controller 21. As a result, supplying the power for each ECU 5a-5e through the power supply line 7 and the individual supply lines 9a-9d is forcibly stopped.

The monitoring controller 21 includes e.g. a microcomputer having a port with a built-in A/D converter and executes a variety of processes in accordance with a predetermined program.

For instance, in the system-off mode where the bypass switch 13 is in an ON state and all the ECUs 5a-5e are supposed to be in the power saving states, the monitoring controller 21 determines the occurrence of a dark-current anomaly state by judging whether or not a current of the power supply line 7 that the current sensor 15 does measure exceeds a threshold value for the judgment of a dark-current anomaly state.

Whether or not the system is in the system-off mode can be judged by the monitoring controller 21 reviewing, for example, the position (LOCK, OFF, ACC, ON, START) of an ignition switch (not illustrated).

Then, in a case of judging the occurrence of a dark-current anomaly state, the monitoring controller 21 executes the detection of an anomaly in the transition of the ECU 5a-5e to the power saving state.

In the detection of an anomaly in the transition to the power saving state, the monitoring controller 21 sequentially switches the current supply switches 19a-19d from an OFF state to an ON state one by one while keeping the turning-on of the bypass switch 13.

Figure 2:
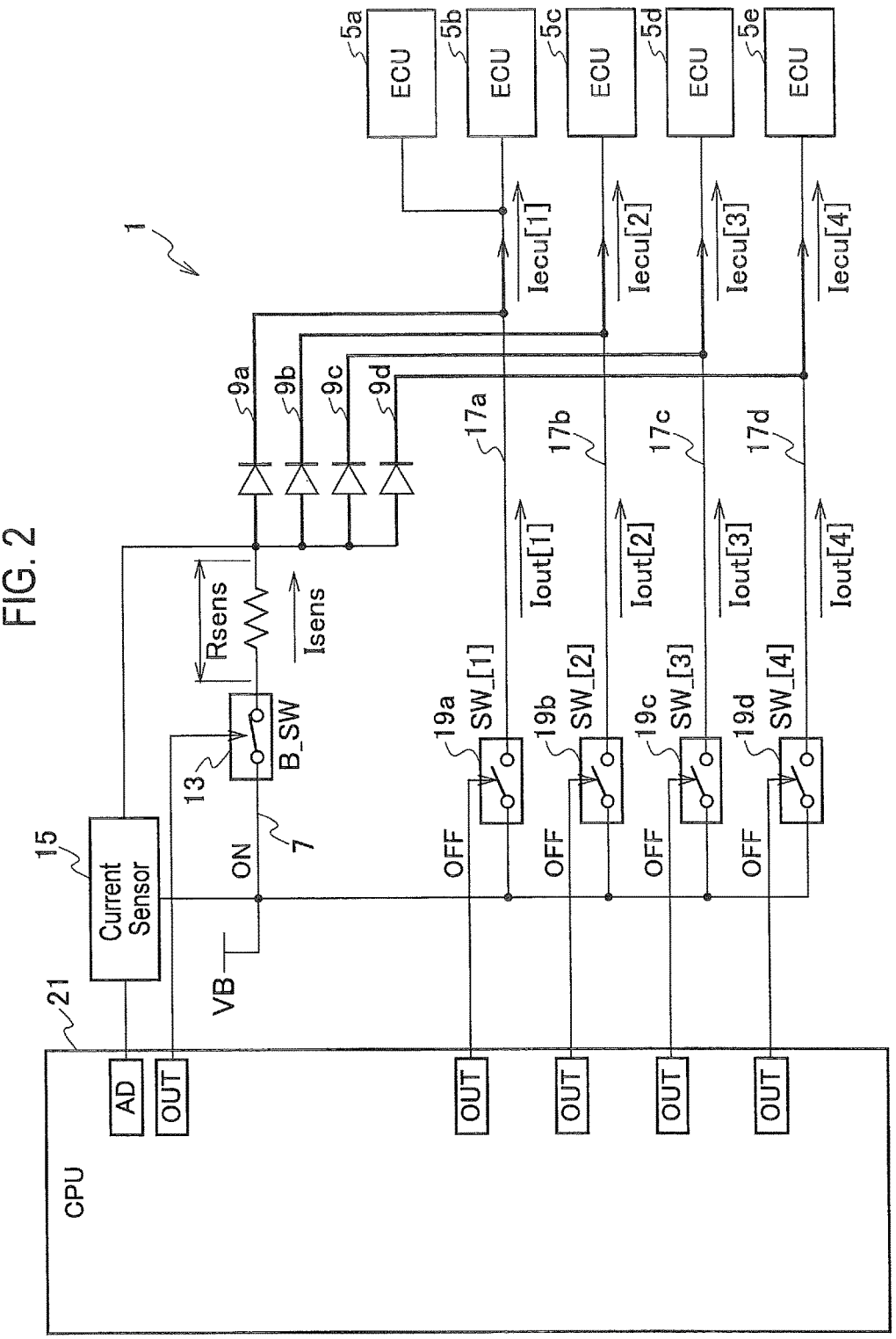
FIG. 2 is a circuit diagram illustrating a power supply route to ECUs when a monitoring controller performs the detecting process of an anomaly in the transition to a power saving state, in the power supply circuit of FIG. 1.

When all the current supply switches 19a-19d are in OFF states, the power supply routes of the power supply VB to the respective ECUs 5a-5e are all including the power supply line 7 and the individual supply lines 9a-9d, as illustrated with bold lines in the circuit diagram of FIG. 2.

Figure 3:
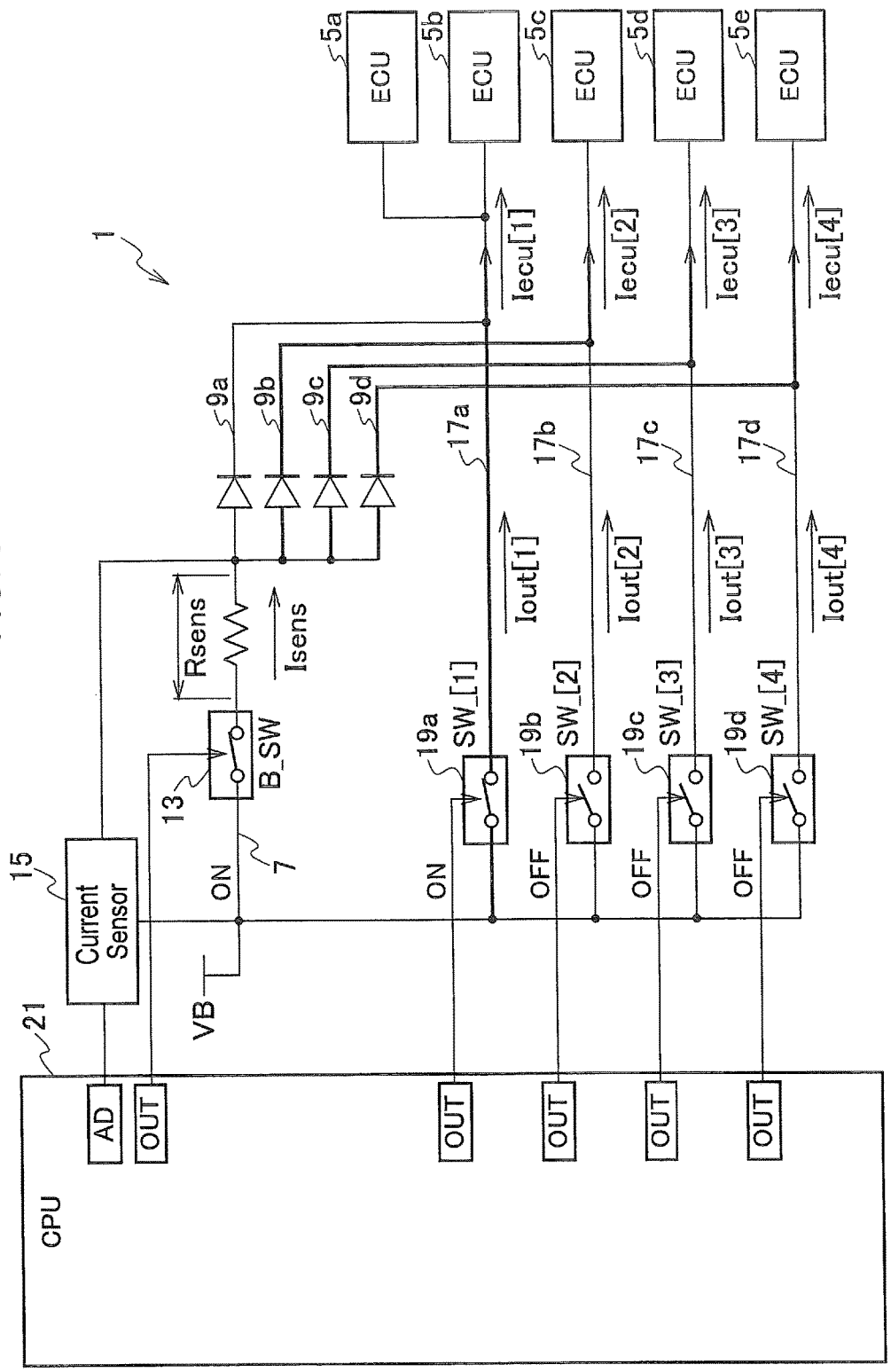
FIG. 3 is a circuit diagram illustrating the power supply route to ECUs when the monitoring controller performs the detecting process of an anomaly in the transition to the power saving state, in the power supply circuit of FIG. 1.

For instance, if switching the current supply switch 19a to an ON state, then the power supply route of the power supply VB to the ECUs 5a, 5b is switched from the power supply line 7 and the individual supply line 9a to the current supply line 17a, as illustrated with a bold line in the circuit diagram of FIG. 3. Incidentally, the circuit diagrams of FIGS. 2 and 3 omit respective illustrations of such as the load 3 and the switch 11.

When the power supply route of the power supply VB to the ECUs 5a, 5b changes, the current flowing through the power supply line 7 is reduced by a current component of the power supplied to the ECUs 5a, 5b. Therefore, by detecting its decreased amount from the magnitude of a current of the power supply line 7 measured by the current sensor 15, the monitoring controller 21 can recognize a current flowing into the ECUs 5a, 5b. Then, by judging whether or not the current has a magnitude consistent with the dark current flowing through the ECUs 5a, 5b in the power saving state, the monitoring controller 21 can judge whether or not an anomaly in the transition to the power saving state occurs in the ECUs 5a, 5b.

Subsequently, while sequentially switching the current supply switches 19b-19d to an ON state, the monitoring controller 21 detects a decreased amount of the current flowing through the power supply line 7 at every switching time. Then, the monitoring controller 21 confirms whether or not the detected decreased amount of current has a magnitude consistent with the dark current flowing in the corresponding ECU 5a-5e. In this way, the monitoring controller 21 can judge whether or not the anomaly in the transition to the power saving state occurs in each ECU 5c-5e, respectively.

Next, it is described the detection process of an anomaly in the transition of each ECU 5a-5e to the power saving state, which is executed by the monitoring controller 21.

Figure 4:
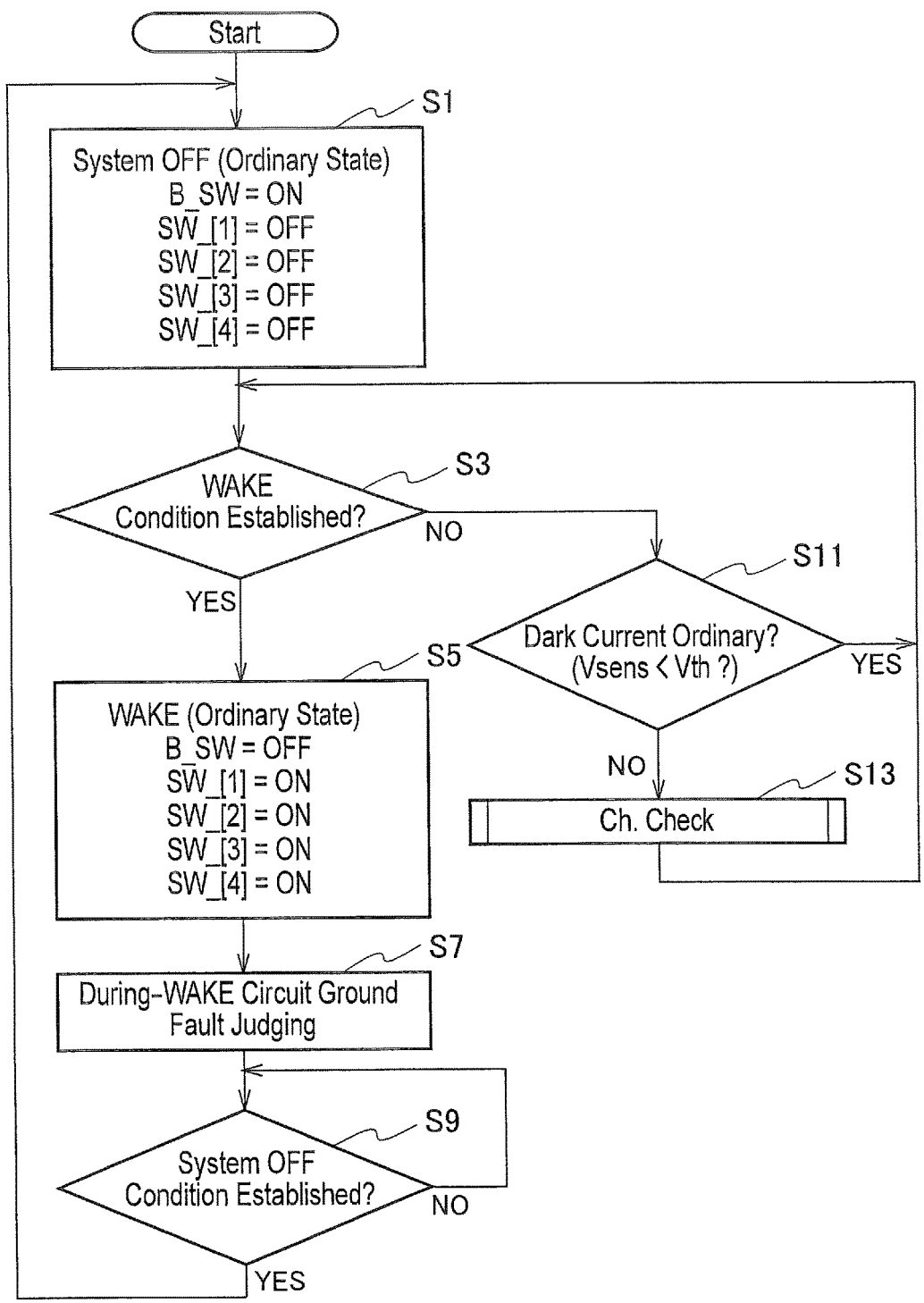
FIG. 4 is a flowchart illustrating the procedures of an anomaly determination process performed by the monitoring controller of FIG. 1.

With the ignition switch (not illustrated) changed in position from "LOCK" to "OFF", as illustrated with the flowchart of FIG. 4, the monitoring controller 21 first sets the bypass switch 13 (B_SW) and the respective current supply switches 19a-19d (SW_[1]-SW_[4]) in a switch pattern of the system-off mode as the initial setting (step S1). In the switch pattern of the system-off mode, the bypass switch 13 (B_SW) comes into an ON state, while each of the current supply switches 19a-19d (SW_[1]-SW_[4]) comes into OFF state.

Next, from the states of the sensors (not illustrated) and the switches (not illustrated), the monitoring controller 21 confirms whether or not the transition condition from the power saving state (SLEEP) to the startup state (WAKE) has been established in at least one of the ECUs 5a-5e (step S3).

If the transition condition has not been established yet (NO at step S3), the process goes to step S11 described later. If the transition condition has been established (YES at step S3), it is executed to make the bypass switch 13 (B_SW) and the current supply switches 19a-19d (SW_[1]-SW_[4]) form a switch pattern of the startup (WAKE) state (step S5). In the switch pattern of the startup (WAKE) state, the bypass switch 13 (B_SW) comes into an OFF state, while each of the current supply switches 19a-19d (SW_[1]-SW_[4]) comes into ON state.

Next, the monitoring controller 21 performs a "during-WAKE circuit ground fault judging" process (step S7). This "during-WAKE circuit ground fault judging" process means a process of monitoring the occurrence of an overcurrent condition in the load 3 and the ECUs 5a-5e. This process is performed by e.g. a ground fault judging circuit (not illustrated) provided independently of the power supply control system 1 to judge a ground fault of the power supply line 7 and the individual supply lines 9a-9d. Accordingly, in the "during-WAKE circuit ground fault judging" process at step S7, if receiving the information of the occurrence of an overcurrent condition from e.g. a ground fault judging circuit (not illustrated), the monitoring controller 21 executes a necessary process etc. addressing such an situation.

Thereafter, from the states of the sensors (not illustrated) and the switches (not illustrated) etc., the monitoring controller 21 confirms whether or not the transition condition to the system-off mode where all the ECUs 5a-5e are brought into the power saving states has been established (step S9). If not established (NO at step S9), the process at step S9 is repeated until the transition condition is established. Conversely, if established (YES at step S9), the process is returned to step S1.

Further, at step S11 to which the process goes as a result of the judgment (NO) at step S3 where the transition condition from the power saving (SLEEP) state to the startup (WAKE) state is not established in at least one of the ECUs 5a-5e, the monitoring controller 21 executes a "dark-current ordinary judging" process.

This "dark-current ordinary judging" process means a process of monitoring the occurrence of a dark-current anomaly state in each ECU 5a-5e. Therefore, the monitoring controller 21 makes a judgment of the dark-current anomaly state by comparing the magnitude of a current of the power supply line 7 measured by the current sensor 15 with a threshold value for judgment of the dark-current anomaly state.

Then, if the dark-current state is ordinary (YES at step S11), the process returns to step S3, and if it is not ordinary (NO at step S11), a "channel (Ch) checking" process is executed (step S13).

This "channel (Ch) checking" process means a process for detecting an anomaly in the transition of each ECU 5a-5e to the power saving state. Therefore, the monitoring controller 21 sequentially switches the current supply switches 19a-19d from OFF states to ON states one by one while keeping the turning-on of the bypass switch 13.

Then, the monitoring controller 21 recognizes a current flowing through the ECU 5a-5e corresponding to the so-switched current supply switch 19a-19d from the decreased amount of the current flowing through the power supply line 7, which is measured by the current sensor 15 at every switching. Furthermore, by judging whether or not the recognized current has a magnitude consistent with the dark current flowing through the corresponding ECU 5a-5e, the monitoring controller 21 judges whether or not an anomaly in the transition to the power saving mode arises in the ECU 5a-5e.

Next, the detailed procedures of the "channel (Ch) check" process at step S13 will be schematically described with reference to the flowcharts of FIGS. 5 and 6.

Figure 5:
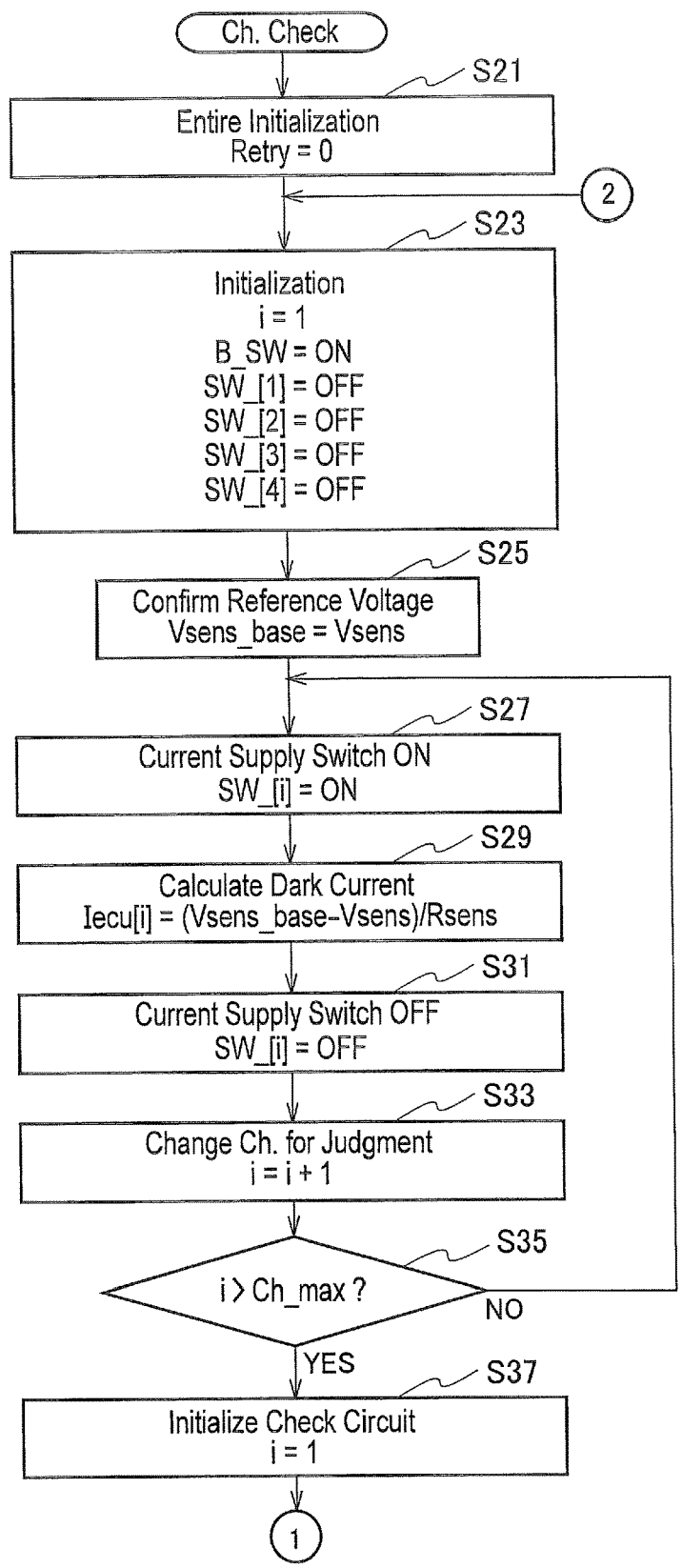
FIG. 5 is a flowchart of a channel check process of FIG. 4.

First, as illustrated in FIG. 5, the monitoring controller 21 executes an entire initialization process of the system (step S21). In the entire initialization process, the monitoring controller 21 sets the counter value Retry of a counter, which indicates the number of times of executing the transition to the system-off mode, to "0".

Next, the monitoring controller 21 executes the initialization process (step S23). In the initialization process, the count value i of a counter of an internal memory (e.g. RAM) provided to specify the current supply switch 19a-19d to be switched from an OFF state to an ON state, is set to "1" corresponding to the current supply switch 19a. Further, the bypass switch 13 (B_SW) is turned ON, while the respective current supply switches 19a-19d (SW_[1]-SW_[4]) are turned OFF.

Incidentally, the count value i="2", the count value i="3", and the count value i="4" correspond to the current supply switch 19b, the current supply switch 19c, and the current supply switch 19d, respectively. Therefore, the maximum value (Ch_max) of the count value i becomes "4" in the first embodiment.

Next, the monitoring controller 21 confirms, as a reference voltage Vsens_base, a voltage drop value of the shunt resistor Rsens (the measured current value Isens by the current sensor 15 multiplied by the resistance of the shunt resistor Rsens) in the present state where the bypass switch 13 (B_SW) is turned ON while the respective current supply switches 19a-19d (SW_[1]-SW_[4]) are turned OFF (step S25).

Then, the monitoring controller 21 switches the current supply switch 19a-19d corresponding to the count value i of the counter to an ON state (step S27), and also calculates a dark current Iecu[i] based on the voltage drop value Vsens of the shunt resistor Rsens at that time (step S29).

Incidentally, the calculation formula of the dark current Iecu[i] can be represented by the following expression of dividing a difference between the voltage drop value Vsens of the shunt resistor Rsens at that time point and the reference voltage Vsens_base confirmed at step S25 by the shunt resistor Rsens (resistance value):

Iecu[i]=(Vsens_base−Vsens)/Rsens.

The calculated dark current Iecu[i] is stored in the internal memory, in association with the count value i of the counter.

Next, the monitoring controller 21 turns off the current supply switch 19a-19d corresponding to the count value i of the counter, which has been switched to an ON state at step S27 (step S31). Then, the monitoring controller 21 increments the count value i of the counter by "1" in order to switch the ECU 5a-5e as an object whose dark current Iecu [i] is to be measured (shifting of judgment Ch) due to the switching of the current supply switch 19a-19d to be turned on (step S33).

Subsequently, the monitoring controller 21 confirms whether or not the dark currents Iecu [i] for all the ECUs 5a-5e have been measured, by judging whether or not the count value i of the counter has exceeded the maximum value (Ch_max) (step S35).

If the count value i has not exceeded the maximum value (Ch_max) (there exists any ECU 5a-5e whose dark current Iecu[i] has not been measured yet) (NO at step S35), then the process returns to step S27. Conversely, if the count value i has exceeded the maximum value (Ch_max) (there is no ECU 5a-5e whose dark current Iecu[i] has not been measured yet) (YES at step S35), then the monitoring controller 21 performs the initialization process of the check circuit where the count value i of the counter is set to "1" (step S37).

This initialization process of the check circuit is carried out to initialize the count value i, which allows which of the ECUs 5a-5e (as an object to be judged about presence of an anomaly in the transition to the power saving state) to be specified through the individual supply line 9a-9d connected thereto and the current supply switch 19a-19d, to "1".

Figure 6:
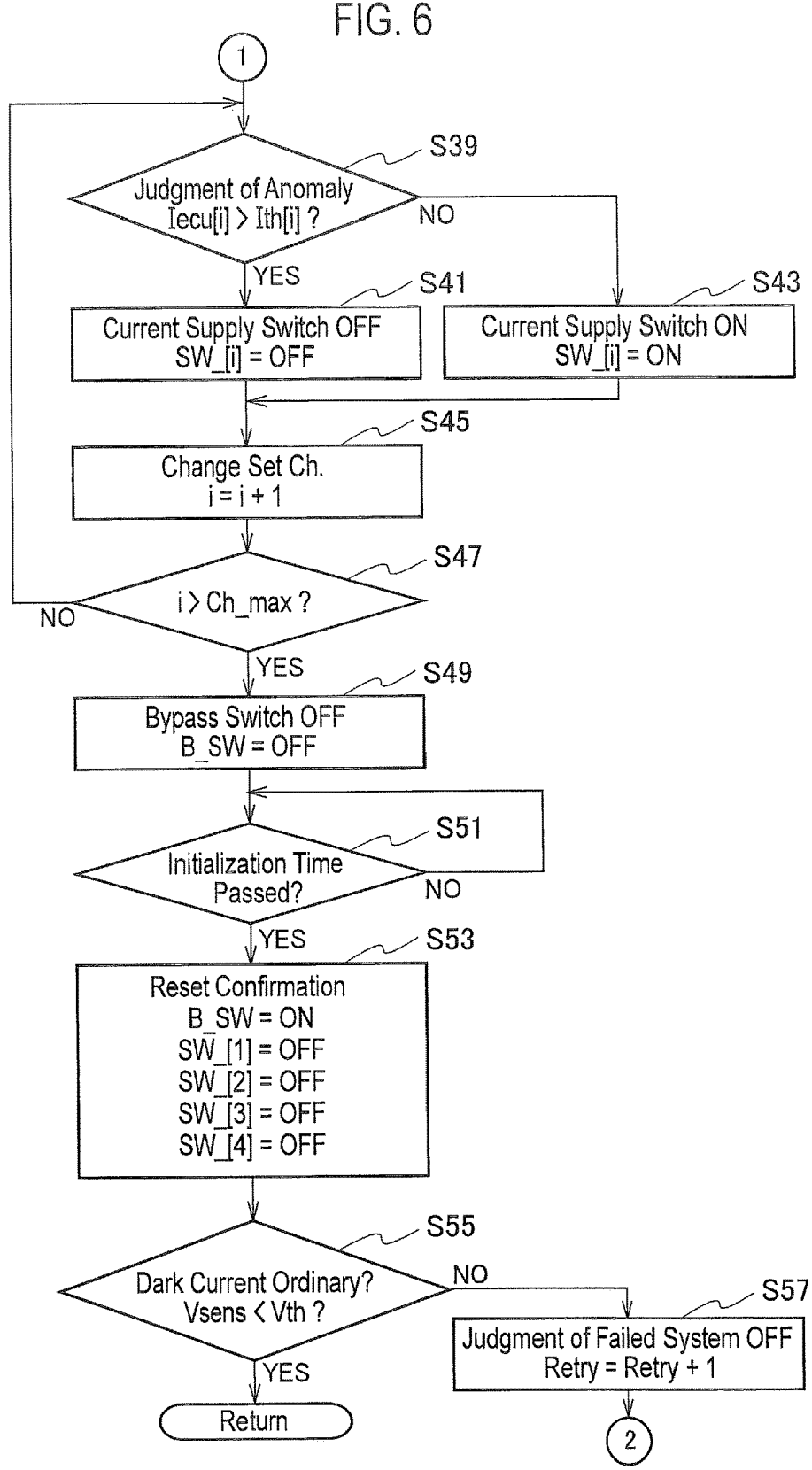
FIG. 6 is a flowchart of the channel check process in FIG. 4.

Next, as illustrated in FIG. 6, the monitoring controller 21 confirms whether or not the dark current Iecu[i] stored in the internal memory corresponding to the count value i of the counter has exceeded a threshold value Ith[i] for judgment of the anomaly state of dark current (step S39). Here, the threshold value Ith[i] for judgment of the anomaly state of dark current is established on the basis of the value of a dark current flowing, in the ordinary case, in the ECU 5a-5e connected to the individual supply line 9a-9d provided with the current supply switch 19a-19d corresponding to the count value i. Each threshold value Ith[i] is stored in the internal memory, in association with the count value i.

If the dark current Iecu[i] exceeds the threshold value Ith[i] (YES at step S39), it is executed to turn off the current supply switch 19a-19d (SW_[1]-SW_[4]) corresponding to the count value i, based on the premise that the dark current flowing in the corresponding ECU 5a-5e is so anomaly as to cause an anomaly in the transition to the power, saving state (step S41).

On the other hand, if the dark current Iecu[i] does not exceed the threshold value Ith[i] (NO at step S39), it is executed to turn on the current supply switch 19a-19d (SW_[1]-SW_[4]) corresponding to the count value i, on the basis of the premise that the dark current flowing through the corresponding ECU 5a-5e is so ordinary as to produce no anomaly in the transition to the power saving state (step S43).

Subsequently, the monitoring controller 21 increments the count value i of the counter by "1" in order to change the ECU 5a-5e (shifting of set Ch) as an object to be judged with respect to an anomaly in the transition to the power saving state (step S45).

Next, the monitoring controller 21 confirms whether or not the anomaly judgment in the transition to the power saving state has been carried out for all the ECUs 5a-5e by judging whether or not the count value i of the counter has exceeded the maximum value (Ch_max) (step S47).

If the count value i has not exceeded the maximum value (Ch_max) (case that there exists the ECU 5a-5e which has not been subjected to the anomaly judgment in the transition to the power saving state) (NO at step S47), the process returns to step S39. Alternatively, if the count value i has exceeded the maximum value (case that there is no ECU 5a-5e which has not been subjected to the anomaly judgment in the transition to the power saving state) (YES at step S47), the monitoring controller 21 turns off the bypass switch 13 (B_SW) (step S49).

Thus, the ECU 5a-5e connected to the individual supply line 9a-9d provided with the current supply switch 19a-19d (SW_[1]-SW_[4]) which is turned off at step S41 will be forcibly shut down by stopping to supply the dark current Iecu[i].

Subsequently, the monitoring controller 21 confirms whether or not a sufficient initialization time for the ECU 5a-5e forcibly shut down by stopping to supply the dark current Iecu[i] to be reset has passed since the switching of the bypass switch 13 (B_SW) to an OFF state (at step S51).

If the initialization time has not passed yet (NO at step S51), the process at step S51 is repeated till its passage. While, if the initialization time has passed (YES at step S51), then the monitoring controller 21 performs a "reset confirmation" process (step S53). This "reset confirmation" process means a process of returning the ECU 5a-5e under the forcible shut down to the power saving state. Thus, the monitoring controller 21 turns on the bypass switch 13 (B_SW) and also turns off the respective current supply switches 19a-19d (SW_[1]-SW_[4]).

Next, the monitoring controller 21 performs a "dark-current ordinary judging" process similar to the process at step S11 of FIG. 4 (step S55). That is, the monitoring controller 21 makes a judgment of the dark-current anomaly state by comparing the magnitude of a current of the power supply line 7 measured by the current sensor 15 with the threshold value for judgment of the dark-current anomaly state.

Then, if the dark-current state is not ordinary (NO at step S55), the controller judges that the transition to the system-off mode has failed and further increments the count value Retry of the counter representing the number of executions of the transition by "1" (step S57). Thereafter, the process returns to step S23 of FIG. 5. On the other hand, if the dark-current state is ordinary (YES at step S55), the "channel (Ch) check" process is ended and the process returns to step S3 of FIG. 4.

By executing the above-mentioned operation, in particular, the processes from steps S23 to S35 (the processes from steps S25 to S35 are repeated), it is judged whether or not an anomaly in the transition to the power saving state arises in the ECUs 5a-5e connected to the individual supply lines 9a-9d.

Thus, with the power supply control system 1 according to the first embodiment, when judging an anomaly in the transition of the ECUs 5a-5e to the power saving state in the system-off mode where the ECUs 5a-5e have to stop supplying the power to the loads 3 and make the transition to the power saving state, the current supply switches 19a-19d are sequentially turned on while keeping the turning-on of the bypass switch 13.

Then, as each current supply line 17a-17d is smaller in resistance than the power supply line 7 interposing the shunt resistor Rsens, the dark current for each ECU 5a-5e will flow through each current supply line 17a-17d exclusively. In other words, although the supply of dark currents to the ECUs 5a-5e in the power saving state is continued, the supply route is changed from the power supply line 7 and the individual supply lines 9a-9d to the current supply lines 17a-17d. As a result, the current Isens flowing through the power supply line 7 is decreased as the dark current for the ECU 5a-5d disappears with the change of the supply route.

Accordingly, by observing a variation of the current Isens of the power supply line 7, which is detected by the current sensor 15 when each current supply switch 19a-19d is turned on during the ON state of the bypass switch 13, it is possible to grasp the dark current flowing in each ECU 5a-5e. By verifying whether or not the grasped dark current is larger than the magnitude of an ordinary dark current, the monitoring controller 21 can judge presence or absence of an anomaly in the transition of each ECU 5a-5e to the power saving state.

Further, when the ECUs 5a-5e are in the activated state to control supplying the power to the loads 3, it is possible to supply the power of the power supply VB for the ECUs 5a-5e by the power supply line 7 and the individual supply lines 9a-9d.

Therefore, even if the ECU 5a-5e is not equipped with a communicating function of informing whether its own state is the power saving state or the startup state to the monitoring controller 21, presence or absence of an anomaly in the transition of the ECU 5a-5e to the power saving can be judged from the current Isens of the power supply line 7, which is detected when the ECUs 5a-5e are supposed to be in the power saving state on control, it is possible to judge state.

Furthermore, as there is no need of measuring respective currents flowing through the current supply lines 17a-17d independently of the current of the power supply line 7 in order to judge presence or absence of an anomaly in the transition of each ECU 5a-5e to the power saving state, it is possible to prevent the circuitry of a current measurement system from being complicated to cause an elevation of the power consumption of the current measurement system.

With the power control system 1 according to the first embodiment, it is constructed so as to supply the current supply lines 17a-17d corresponding to the respective ECUs 5a-5e and the ECUs 5a-5e corresponding to the respective current supply switches 19a-19d with the dark current through different routes from the power supply line 7 and the individual supply lines 9a-9d. In the system-off mode, therefore, by sequentially turning on the respective current supply switches 19a-19d during the on-state of the bypass switch 13, it is possible to judge presence or absence of an anomaly in the transition to the power saving state of each ECU 5a-5e, individually.

Although the first embodiment has been described on the assumption that there exist the plurality of loads 3 and the plurality of ECUs 5a-5e as the controllers controlling to supply the power to the loads 3 correspondingly, the present application is also applicable to an arrangement including only one controller.

Additionally, although the first embodiment has been illustrated by an example of the application on a system controlling to supply the power to the loads 3 mounted on a vehicle, the present application is broadly applicable to, also in the fields other than a vehicle, a power supply control system that controls to supply power to a load with use of a controller.

Second Embodiment

A second embodiment will be described with reference to FIGS. 7 to 13.
(Re. Constitutional Example of Power Supply Control System of Second Embodiment)

A power supply control system 1A according to the second embodiment includes: multiple routes (e.g. route #1-route #3) of control units (ECU1-ECU4, ECU10, ECU11, etc. that will be referred to as ECUs, below) that can change the operation of a plurality of electronic devices (not illustrated, e.g. an on-vehicle watch, a security system, etc.) to a startup state to control the operation performed by each electronic device and a power saving state to stop the control; a predetermined number (two in an example illustrated in FIG. 7) of power supply units (a first power supply unit P1 and a second power supply unit P2) that supply respective routes of ECU1-ECU4 with driving power; a secondary battery 300 including such as nickel-hydrogen batteries or lithium ion batteries for supplying the respective power units with power; a current sensor SN for detecting charge and discharge currents of the secondary battery 300; and a drive controller (which includes CPU, logic IC, or the like, it will be referred to as "CPU" after) 100 that controls the drive of the ECU1-ECU4 and the power supply units P1, P2.

Figure 7:
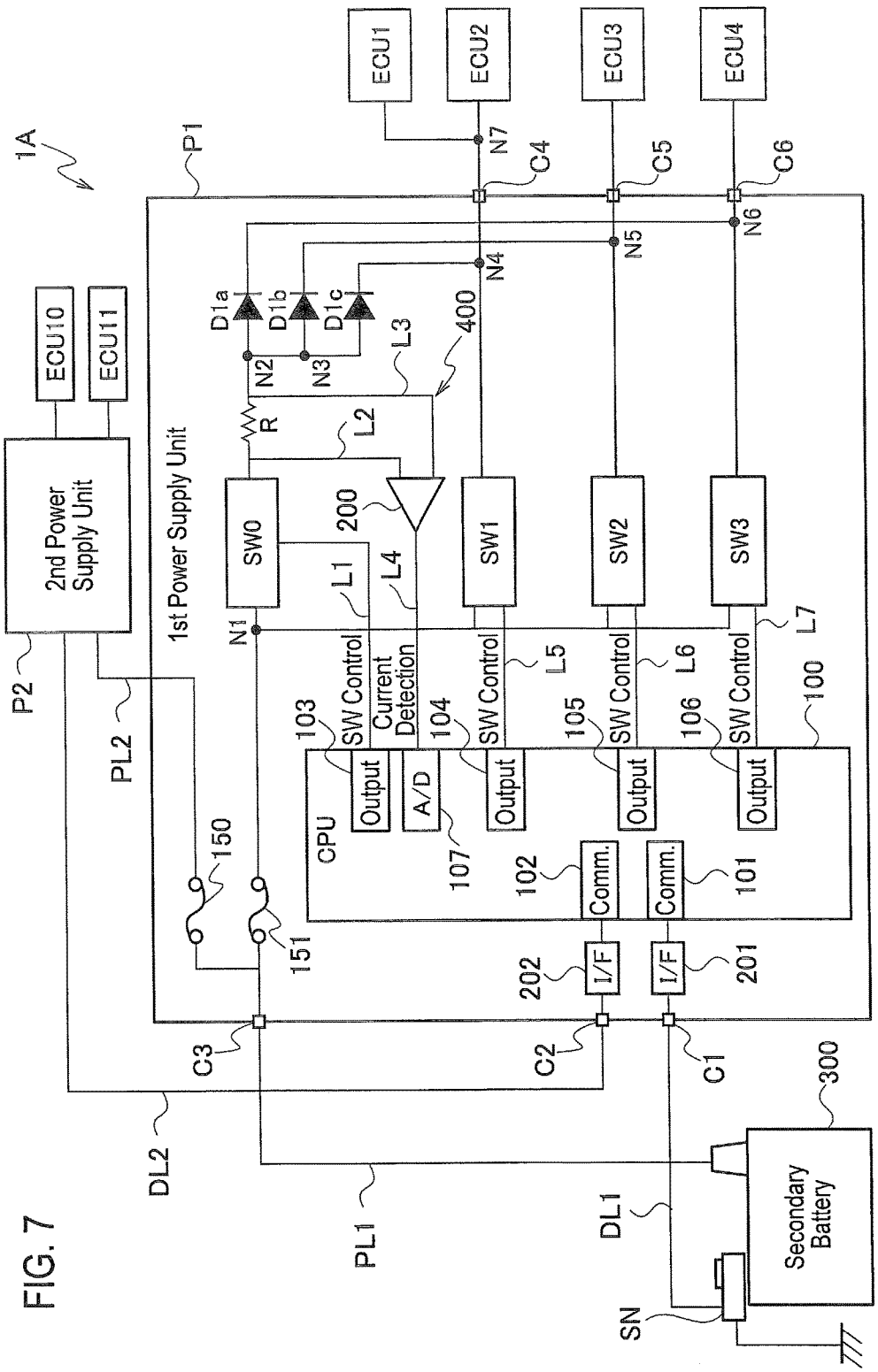
FIG. 7 is a circuit diagram illustrating an example of the circuit constitution of a power supply control system according to a second embodiment.

Additionally, as illustrated in FIG. 7, each of the power supply units P1, P2 includes a first switch (SW0) for executing to supply (or standby to supply) the power to the control units (ECU1-ECU4, etc.) and second switches (SW1-SW3) for executing the systematic classification of the control units (ECU1-ECU4, etc.).

More specifically, in explanation of the first power supply unit P1 as a representative example (that is, the other power supply unit, such as the second power supply unit P2, has the similar constitution), the secondary battery 300 is connected to a connector C3 of the first power supply unit P1 via a power line PL1. In the power supply unit P1, the power line PL1 is branched and connected to the external second power supply unit P2 through a fuse 150 and a power line PL2.

Further, the first switch SW0 and the second switches SW1-SW3 are connected in parallel with a power line extending from a fuse 151, through a node N1.

The other constitution will be described in detail later.

The first switch SW0 is constructed so as to ordinary maintain its ON state and thus energize the respective control units (ECU1-ECU4, etc.). While, the second switches SW1-SW3 are connected to the predetermined control units (ECU1-ECU4, etc.) and also constructed so as to allow their ON and OFF states to be switched in accordance with various conditions.

The first switch SW0 is connected to a current detection circuit 400 for detecting a current flowing through the first switch SW0.

More specifically, the current detection circuit 400 includes a sense resistor R connected in series to the first switch SW0 and a comparator 200 connected to lines L2, L3 extending from both ends of the sense resistor R. A signal generated from the comparator 200 on the basis of a voltage drop caused by a current flowing through the sense resistor R is inputted to an A/D (analog-digital conversion) terminal 107 of the CPU 100 through a line L4. With this configuration, it is possible to detect a current flowing through the first switch SW0. Here, the current detection circuit 400 is not indispensable. That is, if the system includes the current detection circuit 400 as described later, it allows to specify in which of the routes (e.g. routes #1-#3) a dark-current anomaly has occurred. On the other hand, if the system does not include the current detection circuit 400, it remains in an effect of the possibility of judging whether or not the dark-current anomaly has occurred in any one of ECU1-ECU4. The constitution without the current detection circuit 400 will be described as a third embodiment, later.

Further, the sense resistor R is connected, on the opposite side of the first switch SW0, to backflow preventing diodes D1a-D1c via a node N2, and to the ECU1-ECU4 via nodes N4-N6 and connectors C4-C6.

In the example illustrated in FIG. 7, the ECU1 and the ECU2 are connected to each other at a node N7 outside the first power supply unit P1, thereby belonging to the identical route.

The second switch SW1 is connected between the node N1 and the node N4. The second switch SW1 has a control terminal connected to an output terminal 104 for control signals of the CPU 100 through a line L5.

The second switch SW2 is connected between the node N1 and the node N5. The second switch SW2 has a control terminal connected to an output terminal 105 for control signals of the CPU 100 through a line L6.

The second switch SW3 is connected between the node N1 and the node N6. The second switch SW3 has a control terminal connected to an output terminal 106 for control signals of the CPU 100 through a line L7.

A current sensor SN is connected to a communication terminal 101 of the CPU 100 through an interface I/F 201, a connector C1, and a data line DL1, thereby allowing the CPU 100 to receive the detection results of charging and discharging currents of the secondary battery 300.

The second power supply unit P2 is connected to a communication terminal 102 of the CPU 100 through an interface I/F 202, a connector C2, and a data line DL2.

A concrete example of the routes (route #1-route #3) will be described with reference to FIG. 12 later.

The CPU 100 is adapted so as to judge in which of the routes (route #1-route #3) a dark-current anomaly has occurred, based on the detection result of a discharge current of the secondary battery 300 detected by the current sensor the SN, ON and OFF states of the first switch SW0 and the second switches SW1-SW3, and the detection result of the current detection circuit 400. The method of judging the dark-current anomaly will be described in detail later.

The CPU 100 is adapted so as to control the switching of ON and OFF states of the first switch SW0 or the second switches SW1-SW3 to block the power supply to a route where the dark-current anomaly is determined to occur. Accordingly, an unnecessary supplying the power from the secondary battery 300 is prevented and therefore, it is possible to suppress a wasteful consumption of the secondary battery 300 (so-called "battery exhausting" condition). In the arrangement where the power supply control system 1A according to the second embodiment is mounted on a vehicle or the like, therefore, it is possible to suppress the occurrence of such a situation that an engine cannot be started due to the battery exhaustion.

The CPU 100 is adapted so as to control the initialization process (power-on reset) for returning a control unit (ECU1-ECU4, etc.), which belongs to the route where the dark-current anomaly is determined to occur, to the ordinary state. The process procedures of respective controls will be described later.

With the power supply control system 1A having such a constitution, there arises the effect that even an anomaly generated in an ECU out of communication can be detected. Further, it is possible to judge the occurrence of an anomaly on the basis of a current value for each route. Further, owing to power-on reset, it is possible to obtain the effect that a recovery operation from anomaly can be executed.

In the power supply control system 1A according to the second embodiment, the current sensor SN may be constructed so as to transmit the detection results of charging and discharging currents of the secondary battery 300 to a monitoring device (e.g. a server installed outside etc.) for monitoring the charging state of the secondary battery 300.

The system may be constructed so as to activate the power supply units P1, P2 or the control units (ECU1-ECU4, etc.) through communication when the current sensor SN detects a consumption current larger than a predetermined vehicular dark current.

The ECU1-ECU4, etc. may be constructed so as to inform the respective power supply units P1, P2 of the occurrence of the dark-current anomaly, provided that the ECU1-ECU4, etc. are activated as a result of a detection of the dark-current anomaly by the current sensor SN.

Then, the power supply units P1, P2 may be constructed so as to control respective ON and OFF states of the first switch SW0 and the second switches SW1-SW3 when receiving a signal indicating the occurrence of the dark-current anomaly.

The power supply units P1, P2 or the ECU1-ECU4, etc. may control the current sensor SN so as to change to the sleep state after performing power-on reset.

The power supply units P1, P2 may be constructed so as to: detect a current value of each route under condition that the dark-current anomaly has not occurred; record the detected current value in a nonvolatile memory etc.; and perform a judgment of a route where the dark-current anomaly has occurred, with reference to a difference between the recorded value and a detected current value. Thus, it becomes unnecessary to detect a current value with high accuracy, thereby allowing the manufacturing cost to be reduced.

According to the above-mentioned constitution, even when there is a possibility of engine start disability due to a battery exhaustion derived from a long-term parking etc. despite that the dark current is within an ordinary range, it is possible to suppress the occurrence of such a situation by turning off the first switch SW0 and the second switches SW1-SW3.

(Re. Overall Constitution of Power Supply Control System of Second Embodiment)

Figure 8:
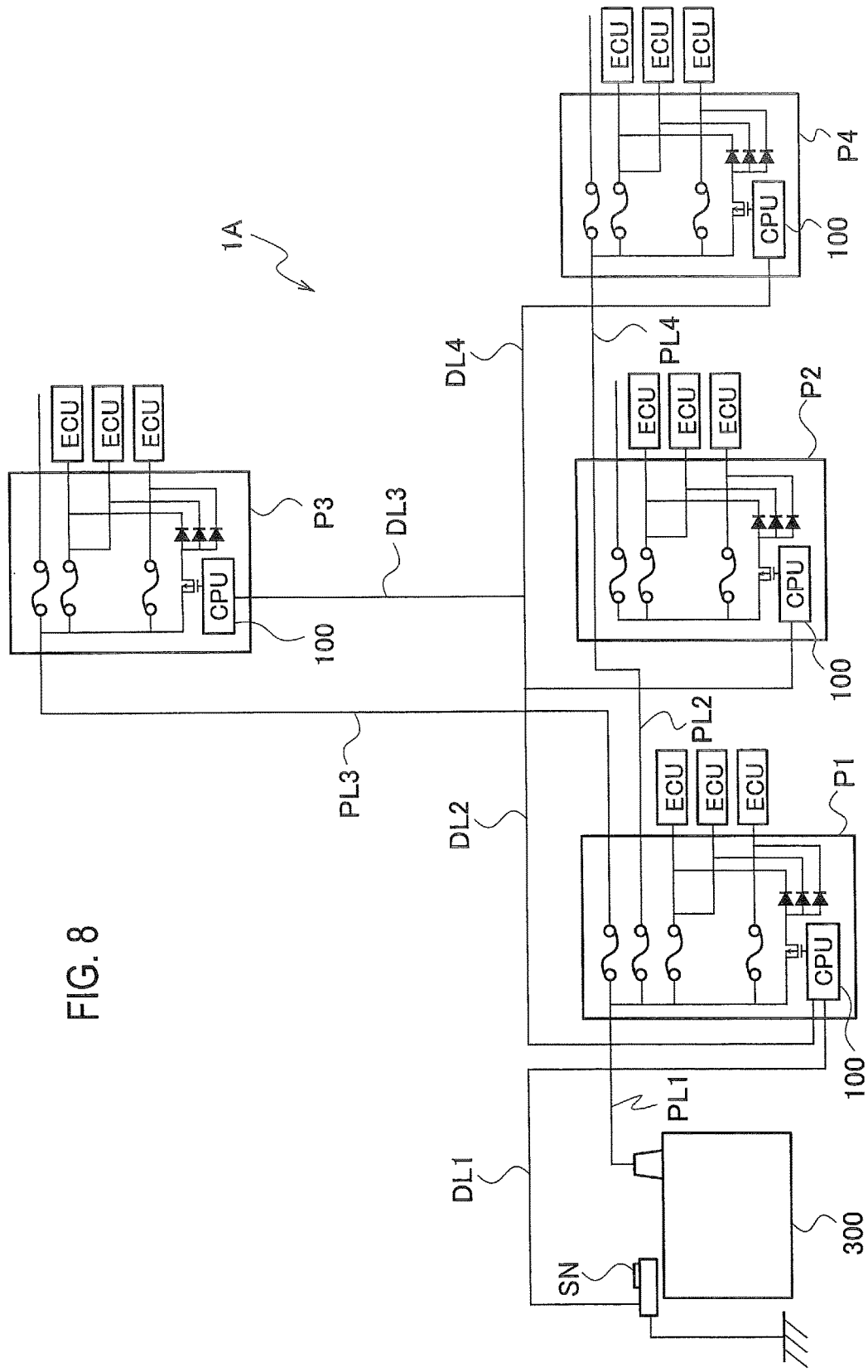
FIG. 8 is a constitutional diagram illustrating an example of the entire constitution of the power supply control system according to the second embodiment.

FIG. 8 is a constitutional diagram illustrating an example of the overall constitution of the power supply control system 1A according to the second embodiment.

FIG. 8 illustrates an example of the power supply control system 1A including four power supply units P1-P4. Incidentally, the number of power supply units may be selected by an arbitrary number without being limited to two as in FIG. 7 or four as in FIG. 8.

Each of the power supply units P1-P4 has the same constitution as the power supply unit P1 illustrated in FIG. 7.

In the example illustrated in FIG. 8, as for the power system, the secondary battery 300 and the power supply units P1-P4 are connected to each other through power lines PL1-PL4.

As for the signal system, the current sensor SN and the CPUs 100 provided in the respective power supply units P1-P4 are connected to each other through data lines DL1-DL4.

With the power control system 1A having the above constitution, in each of the power supply units P1-P4, it is possible to detect a situation where an anomaly occurs in an ECU out of communication. Also, the occurrence of an anomaly can be judged on the basis of a current value with respect to each route and additionally, it is possible to perform the recovery operation of ECUs from anomaly by performing power-on reset.

(Process at Time of Dark-Current Anomaly Occurrence)

An example of the processing procedure of a process at time of dark-current anomaly occurrence executed by the power supply control system 1A according to the second embodiment will be described with reference to flowcharts illustrated in FIGS. 9-11.

Figure 9:
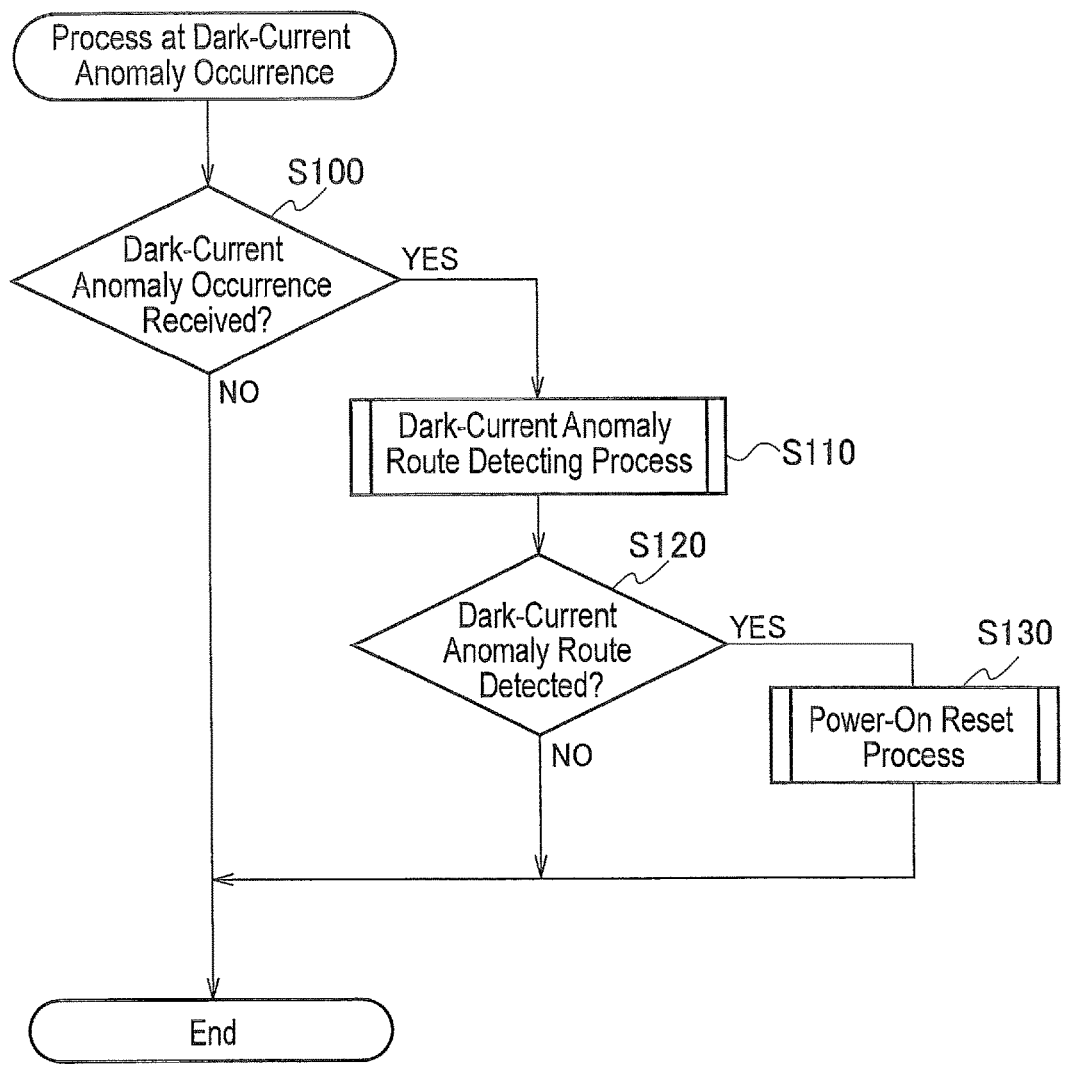
FIG. 9 is a flowchart illustrating an example of the process procedures of a process at the occurrence of a dark-current anomaly, executed by the power supply control system according to the second embodiment.

Here, FIG. 9 is a flowchart illustrating an example of the processing procedure of the process at time of dark-current anomaly occurrence executed by the power supply control system 1A according to the second embodiment.

Figure 10:
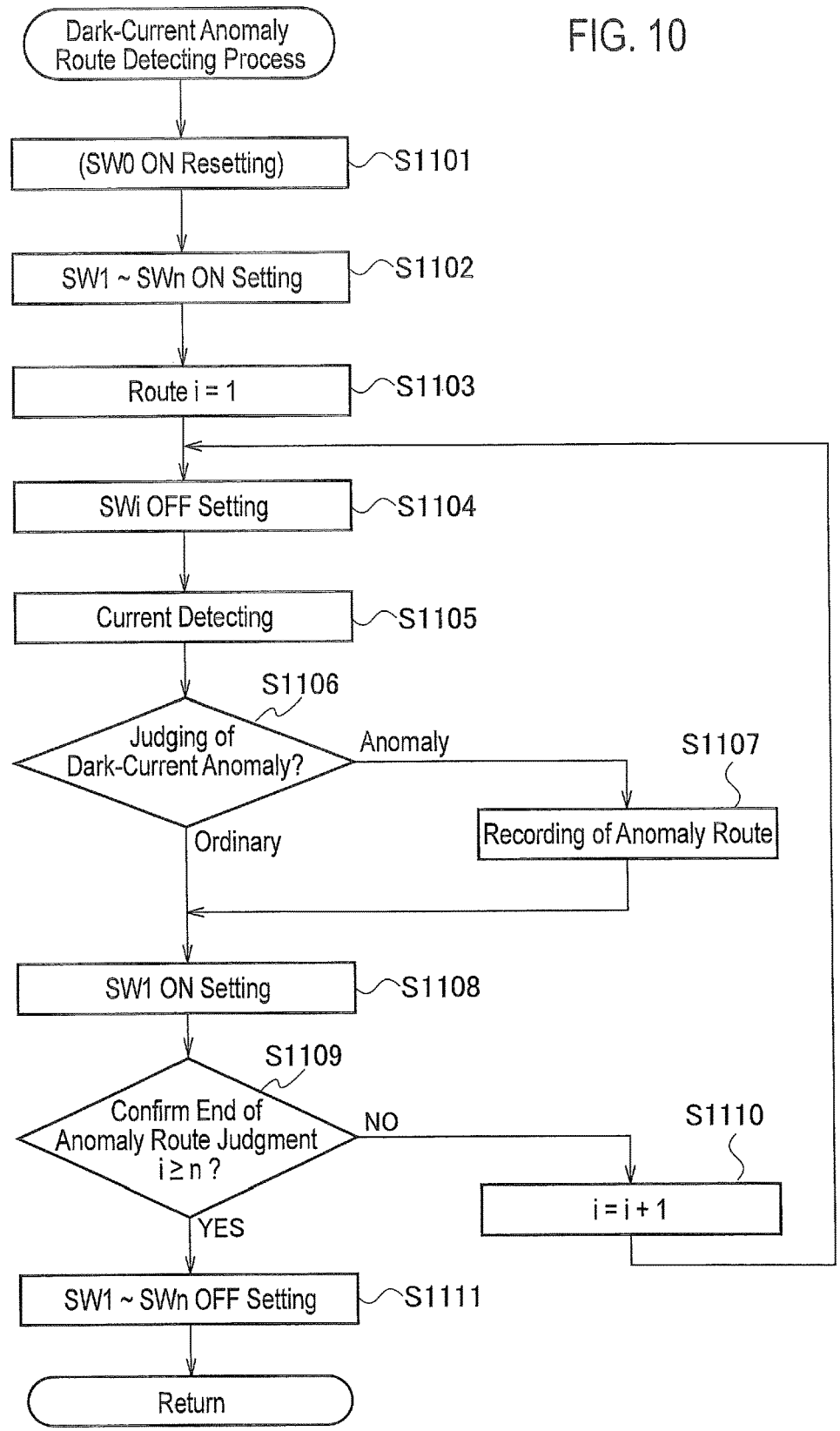
FIG. 10 is a flowchart illustrating an example of the process procedures of a subroutine related to a dark-current anomaly route detecting process in the power supply control system according to the second embodiment.
Figure 11:
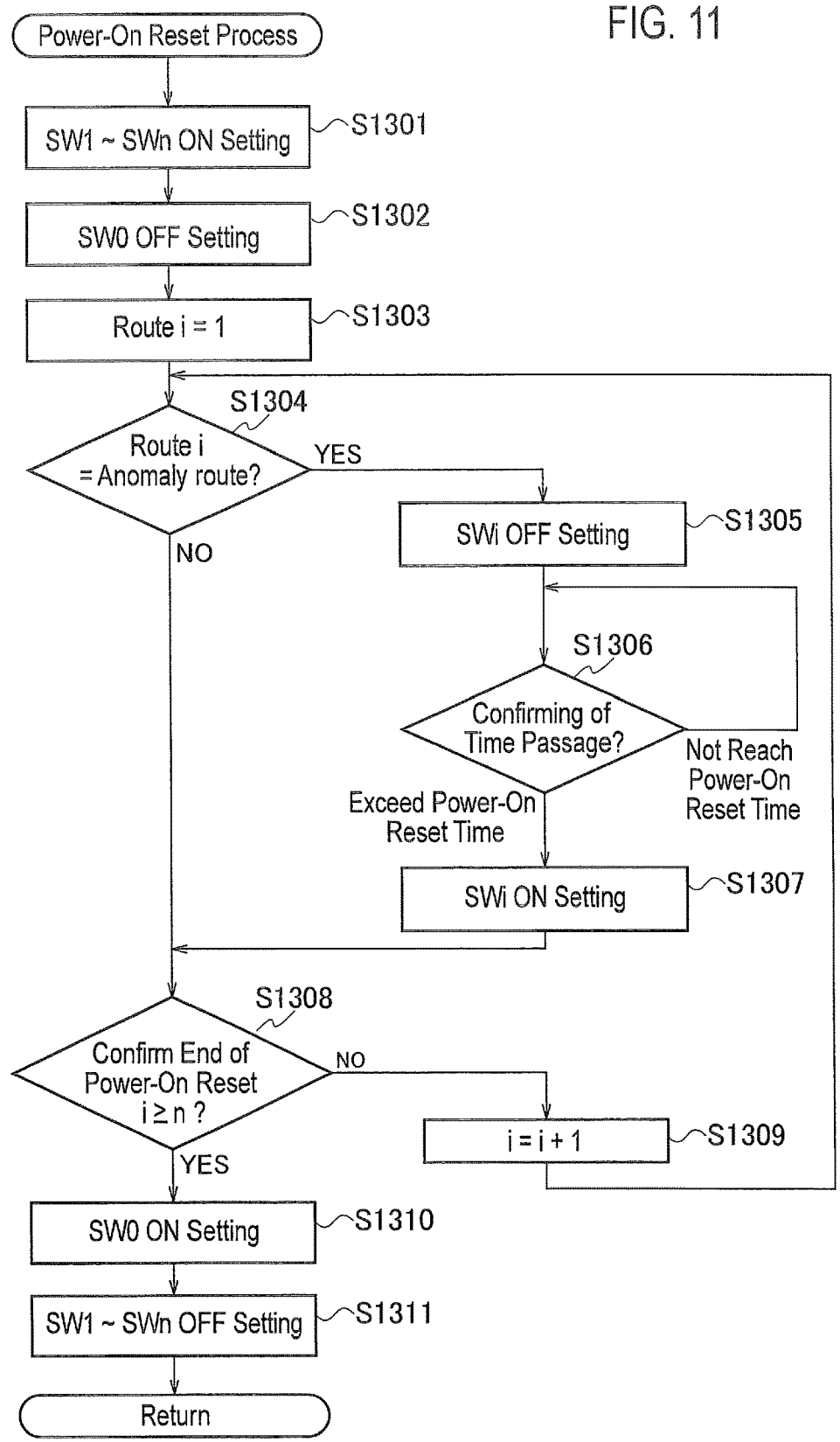
FIG. 11 is a flowchart illustrating an example of the process procedures of a subroutine related to a power-on reset process in the power supply control system according to the second embodiment.

Further, FIG. 10 is a flowchart illustrating an example of the processing procedure of a subroutine according to the dark-current anomaly route detection process, while FIG. 11 is a flowchart illustrating an example of the processing procedure of a subroutine related to the power-on reset process.

For convenience of explanation, it is assumed that the power supply control system 1A is mounted on a vehicle, and that the process at time of dark-current anomaly occurrence is executed by the CPU 100 of the power supply unit P1.

When the process at time of dark-current anomaly occurrence illustrated in the flowchart of FIG. 9 is started, it is firstly executed at step S100 to judge whether or not a signal indicating the occurrence of dark-current anomaly has been received. That is, when the current sensor SN provided in the secondary battery 300 detects a consumption current larger than a preset vehicular dark current (case that the dark-current anomaly has occurred), the detection result is transmitted to the CPU 100 through the data line DL1. Thus, at this step, it is executed to judge whether or not the CPU 100 has received the detection result's signal (i.e. a signal indicating the occurrence of a dark-current anomaly).

Then, if the result of judgment is "No", then the process is completed without change. While, if the judgment is "Yes", the process goes to step S110.

At step S110, the subroutine for the dark-current anomaly route detection process is executed.

Here, the procedure of the dark-current anomaly route detection process will be described with reference to the flowchart of FIG. 10. Incidentally, ON and OFF states of the respective switches (the first switch SW0 and the second switches SW1-SW3) at the execution of the dark-current anomaly route detection process is illustrated with a table of FIG. 12.

At step S1101, the ON resetting process of turning on the first switch SW0 is performed. Thus, as illustrated in FIG. 12, the switch SW0 is maintained in an "ON" state in the dark-current anomaly route detection process for respective routes (routes #1-#3).

Next, at step S1102, the ON setting process of turning on the second switches SW1-SWn (n: an integer; n=3 in the example illustrated in FIG. 7) is executed. Consequently, all of the second switches SW1-SWn are set to ON states once.

Next, at step S1103, the route number "i" is set to 1 (route i=1) and then the process goes to step S1104.

At step S1104, the OFF setting process of the switch SWi is performed. Thus, in the "route #1" of FIG. 12, only the second switch SW1 is turned off, while the other switches, i.e., the first switch SW0 and the second switches SW2, SW3 are turned on.

At step S1105, the current detection process using a detection result by the current detection circuit 400 connected to the first switch SW0 is performed. At next step S1106, the dark-current anomaly judgment process is executed on the basis of the detection result of current. That is, if the detection result by the current detecting circuit 400 exceeds a preset threshold value for dark-current anomaly, the judgment of "anomaly" is given. While, if the detection result does not exceed the threshold value, the judgment of "ordinary" is given Then, in case of the judgment of "anomaly", the process goes to step S1107 where an anomaly route recording process is performed. That is, if it is judged that the route #1 is "anomaly", such information is stored in, for example, a nonvolatile memory (not illustrated) etc. connected to the CPU 100 and the process goes to step S1108.

Alternatively, in a case of the judgment of "ordinary" at step S1106, the process goes to step S1108 where the ON setting process of the switch SWi (i.e. SW1) is executed and the process goes to step S1109.

At step S1109, the process of confirming a completion of the anomaly route judgment is performed by judging whether or not an inequality i≥n has been realized. Then, if it is judged that the inequality i≥n has not been realized yet (case of "No"), the process goes to step S1110 where the route number "i" is incremented by "1" and thereafter, the process goes to step S1104. In this way, the processes of steps S1104 to S1109 are repeatedly executed until the route number "i" reaches a predetermined number (i=3 in the constitution illustrated in FIG. 7).

That is, as illustrated in FIG. 12, there are sequentially executed one judgment process about presence or absence of a dark-current anomaly in the "route #2" under condition that only the second switch SW2 is turned off, while the other switches, i.e. the first switch SW0 and the second switches SW1, SW3 are turned on, and another judgment process about presence or absence of a dark-current anomaly in the "route #3" under condition that only the second switch SW3 is turned off, while the other switches, i.e. the first switch SW0 and the second switches SW1, SW2 are turned on.

Consequently, it is possible to detect in which of the routes the dark-current anomaly has occurred, without omission.

On the other hand, if it is judged that the inequality i≥n has been realized (i.e. case of "Yes") at step S1109, the process goes to step S1111 where the process of turning off all the second switches SW1-SWn is executed and thereafter, the process returns to the main process of FIG. 9.

Returning to the flowchart of FIG. 9, it is executed at step S120 to judge whether or not the dark-current anomaly route has been detected. Then, if it is judged that no dark-current anomaly route has been detected (i.e. case of "No"), the process will be ended. On the other hand, if it is judged that the dark-current anomaly route has been detected (i.e. case of "Yes"), the process goes to step S130 where the subroutine of power-on reset process is performed.

Here, the procedure of the power-on reset process will be described with reference to the flowchart of FIG. 11. Incidentally, ON and OFF states of the respective switches (the first switch SW0 and the second switches SW1-SW3) at the execution of the power-on reset process are illustrated with a table of FIG. 13.

At step S1301, the ON setting process of turning on the second switches SW1-SWn (n: an integer; n=3 in the example illustrated in FIG. 7) is performed. Consequently, all of the second switches SW1-SWn are set to ON states once.

Next, at step S1302, the OFF setting process of turning off the first switch SW0 is executed.

Next, at step S1303, the route number "i" is set to 1 (route i=1) and then the process goes to step S1304.

At step S1304, it is executed to judge whether or not the route i (i.e. the route #1 here) is an anomaly route.

If the judgment result is "No", then the process goes to step S1308. While, if the judgment result is "Yes", then the process goes to step S1305.

At step S1305, the OFF setting process of turning off the switch SWi (i.e. SW1 here) is executed.

Thus, as illustrated in FIG. 13, in the "route #1", the first switch SW0 and the second switch SW1 are turned off, while the second switches SW2, SW3 are turned on.

At step S1306, there is executed a confirming process of the passage of time to judge whether or not a predetermined time (i.e. a power-on reset time) has passed. Here, it is executed to wait ready until time reaches the power-on reset time. Then, if reaching the power-on reset time, the power-on reset process is executed and the process goes to step S1307.

At step S1307, the ON setting process of turning on the switch SWi is performed and thereafter, the process goes to step S1308.

At step S1308, the process of confirming a completion of the power-on reset process is performed by judging whether or not an inequality i≥n has been realized.

Then, if it is judged that the inequality i≥n has not been realized yet (case of "No"), the process goes to step S1309 where the route number "i" is incremented by "1" and thereafter, the process goes to step S1304. In this way, the processes of steps S1304 to S1308 are repeatedly executed until the route number "i" reaches a predetermined number (i=3 in the constitution illustrated in FIG. 7).

That is, as illustrated in FIG. 13, there are sequentially executed one power-on reset process about the "route #2"

under condition that the first switch SW0 and the second switch SW2 are turned off, while the second switches SW1, SW3 are turned on, and another power-on reset process about the "route #3" under condition that the first switch SW0 and the second switch SW3 are turned off, while the second switches SW1, SW2 are turned on.

Consequently, it is possible to perform the power-on reset against an ECU belonging to a route where the dark-current anomaly has occurred, without omission.

On the other hand, if it is judged that the inequality i≥n has been realized (i.e. case of "Yes") at step S1308, the process goes to step S1310 where the process of turning on the first switch SW0 is executed and thereafter, the process goes to step S1311.

At step S1311, the process of turning on all the second switches SW1-SWn is executed and thereafter, the process returns to the main process of FIG. 9 where the process is ended.

As described above, with the power supply control system 1A according to the second embodiment, even if there arises an anomaly in an ECU out of communication, it is possible to detect such a situation. Also, the occurrence of an anomaly can be judged on the basis of a current value with respect to each route and additionally, it is possible to perform the recovery operation from anomaly by performing power-on reset.

Further, when the power supply unit P1 etc. is constructed so as to: detect a current value of each route under condition that the dark-current anomaly has not occurred; record the detected current value in a nonvolatile memory etc.; and perform a judgment of a route where the dark-current anomaly has occurred, with reference to a difference between the recorded value and a detected current value, it becomes unnecessary to detect a current value with high accuracy, thereby allowing the manufacturing cost to be reduced.

Third Embodiment

A third embodiment will be described with reference to FIGS. 14 to 16.
(Re. Constitutional Example of Power Supply Control System of Third Embodiment)

Figure 14:
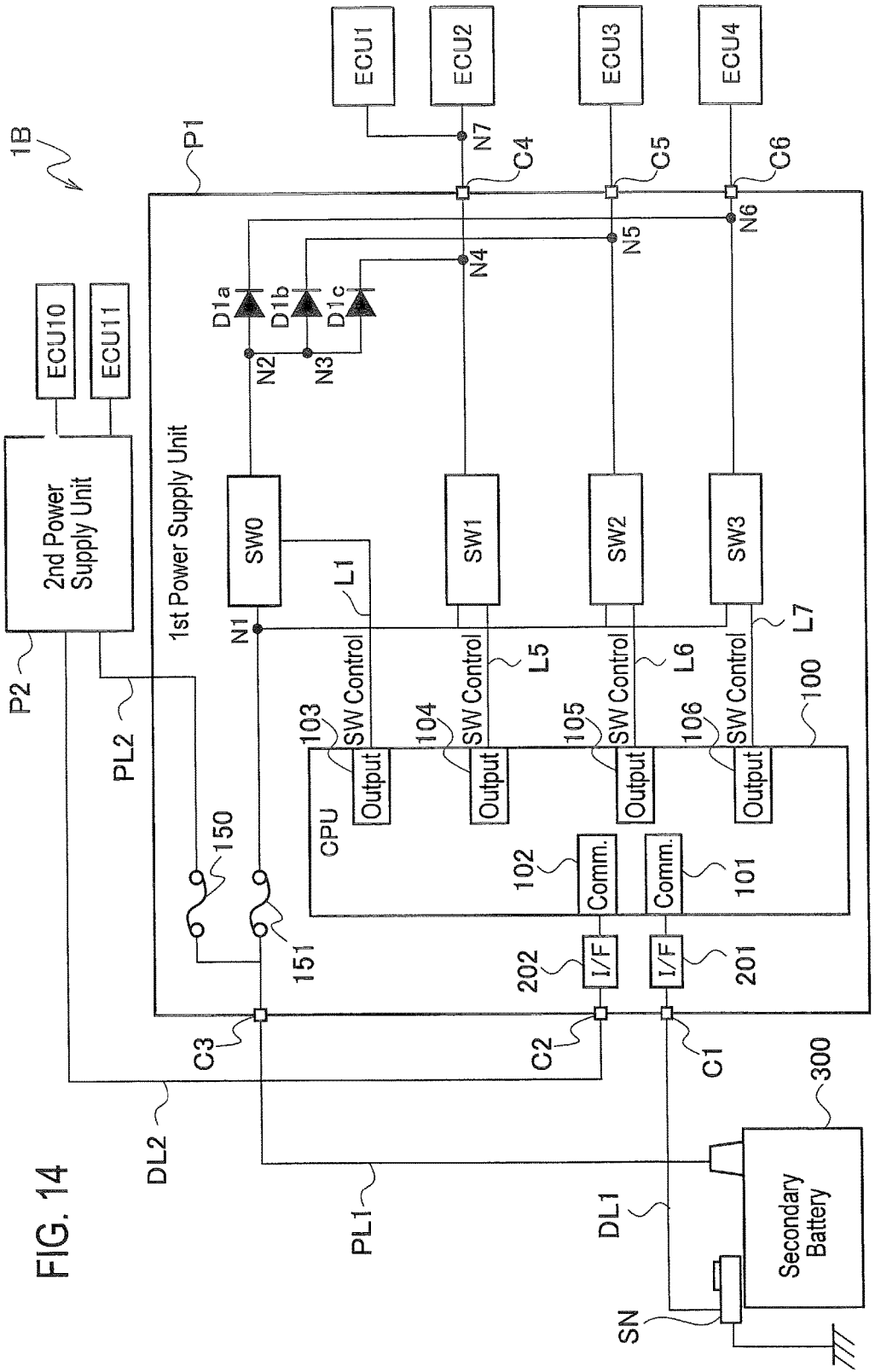
FIG. 14 is a circuit diagram illustrating an example of the circuit constitution of a power supply control system according to a third embodiment.

FIG. 14 is a circuit diagram illustrating an example of a circuit constitution of a power supply control system 1B according to the third embodiment. In the third embodiment, elements similar to those of the second embodiment are indicated with the same reference numerals, and their overlapping descriptions are omitted. The power supply control system 1B according to the third embodiment differs from the power supply control system 1A according to the second embodiment in that the current detection circuit 400 is removed from respective power supply units (P1 etc.). Namely, there are eliminated the sense resistor R connected in series to the first switch SW0 constituting the current detection circuit 400, and the comparator 200.

In this way, owing to the absence of a resistor for detecting a current (sense resistor R), it is possible to supply a power necessary for the operation of ECUs (ECU1 etc.) through the route of the first switch SW0. Accordingly, if an anomaly arises in the second switch SW1-SW3, it is possible to perform to supply (backup) the power through the first switch SW0.

The judgment of a route where a dark-current anomaly has occurred is not performed in the third embodiment, but the power-on reset process is performed for each route at the time of the dark-current anomaly occurrence, thereby executing the recovery process from the dark-current anomaly.
(Process at Time of Dark-Current Anomaly Occurrence)

Figure 15:
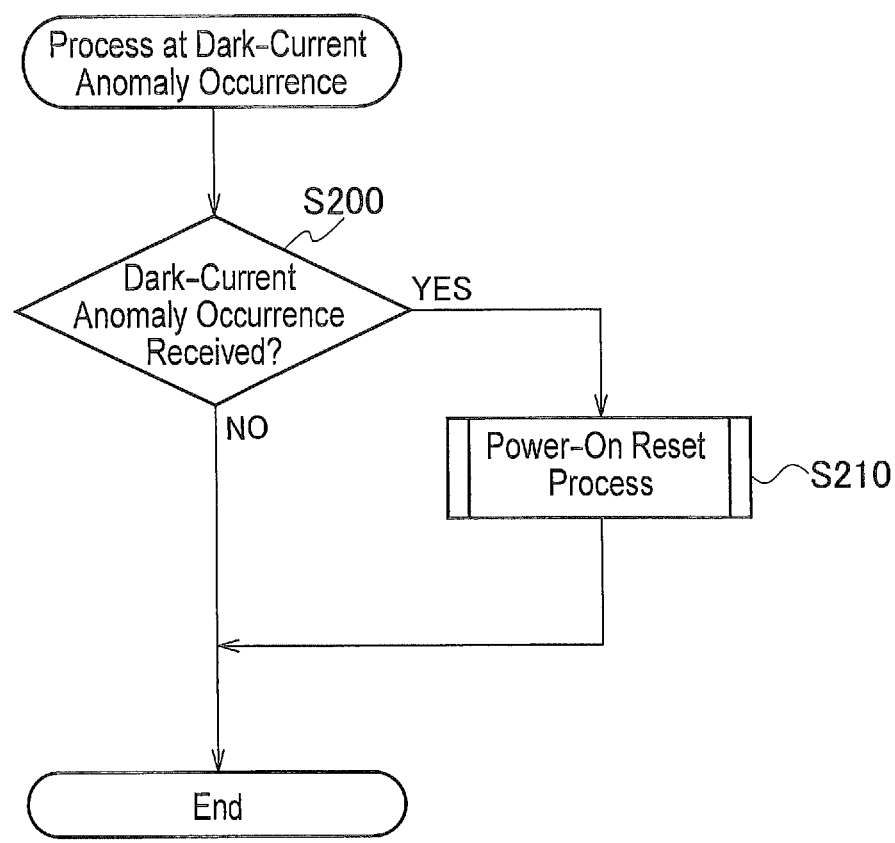
FIG. 15 is a flowchart illustrating an example of the process procedures of a process at the occurrence of a dark-current anomaly, executed by the power supply control system according to the third embodiment.
Figure 16:
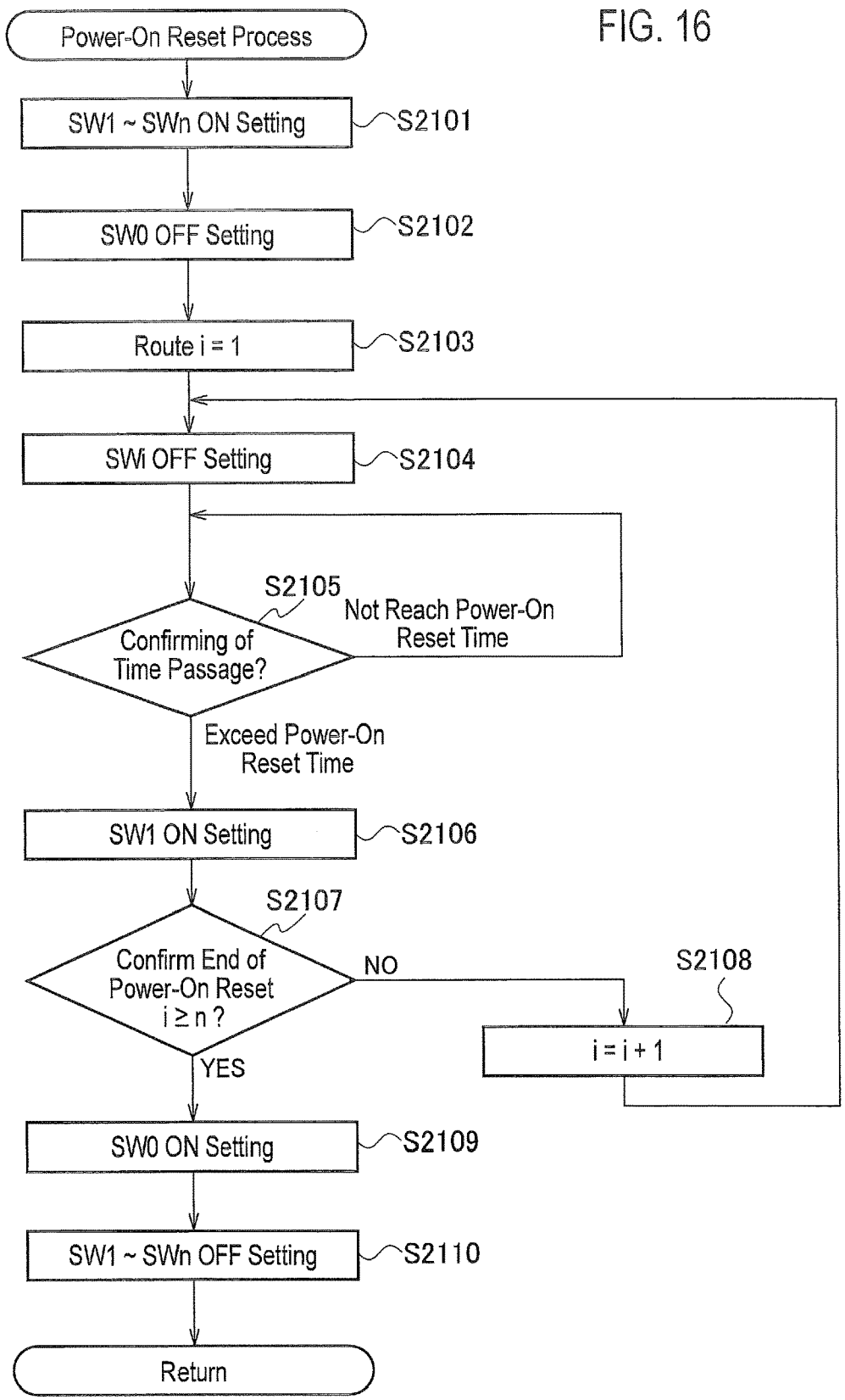
FIG. 16 is a flowchart illustrating an example of the process procedures of a subroutine related to the power-on reset process in the power supply control system according to the third embodiment.

Referring to flowcharts illustrated in FIGS. 15 and 16, it is described an example of the procedures of a process at time of dark-current anomaly occurrence, which is executed by the power supply control system 1B according to the third embodiment.

Here, FIG. 15 is a flowchart illustrating an example of the procedures of the process at time of dark-current anomaly occurrence, which is executed by the power supply control system 1B according to the third embodiment. Further, FIG. 16 is a flowchart illustrating an example of the process procedures of a subroutine related to the power-on reset process.

For convenience of explanation, it is assumed that the power supply control system 1B is mounted on a vehicle and that the process at time of dark-current anomaly occurrence is executed by the CPU 100 of the power supply unit P1 illustrated in FIG. 14.

When the process at time of dark-current anomaly occurrence illustrated in the flowchart of FIG. 15 is started, it is firstly executed at step S200 to judge whether or not a signal indicating the occurrence of a dark-current anomaly has been received. That is, when the current sensor SN provided in the secondary battery 300 detects a consumption current larger than a preset vehicular dark current (case that the dark-current anomaly has occurred), the detection result is transmitted to the CPU 100 through the data line DL1. Thus, at step 200, it is executed to judge whether or not the CPU 100 has received the detection result's signal (i.e. a signal indicating the occurrence of a dark-current anomaly).

If the result of judgment is "No", then the process is completed without change. While, if the judgment is "Yes", the process goes to step S210 where the subroutine of the power-on reset process is executed.

Here, the process procedure of the power-on reset process will be described with reference to the flowchart of FIG. 16.

At step S2101, the ON setting process of turning on the second switches SW1-SWn (n: an integer; n=3 in the example illustrated in FIG. 14) is executed. Consequently, all of the second switches SW1-SWn are set to ON states once. Next, at step S2102, the OFF setting process of turning off the first switch SW0 is executed.

Next, at step S2103, the route number "i" is set to 1 (route i=1) and then the process goes to step S2104.

At step S2105, there is executed a confirming process of the passage of time to judge whether or not a predetermined time (i.e. a power-on reset time) has passed. Here, it is executed to wait ready until time reaches the power-on reset time. Then, if reaching the power-on reset time, the power-on reset process is executed and the process goes to step S2106. At step S2106, the ON setting process of turning on the second switch SWi (i.e. SW1) is executed and thereafter, the process goes to step S2107.

At step S2107, the process of confirming a completion of the power-on reset process is performed by judging whether or not an inequality i≥n has been realized. Then, if it is judged that the inequality i≥n has not been realized yet (case of "No"), the process goes to step S2108 where the route number "i" is incremented by "1" and thereafter, the process goes to step S2104. In this way, the processes of steps S2104 to S2107 are repeatedly executed until the route number "i" reaches a predetermined number (i=3 in the constitution illustrated in FIG. 14).

Consequently, it is possible to perform the power-on reset against an ECU belonging to a route where the dark-current anomaly has occurred, without omission.

On the other hand, if it is judged that the inequality i≥n has been realized (i.e. case of "Yes") at step S2107, the process goes to step S2109 where the ON setting process of turning on the first switch SW0 is executed and thereafter, the process goes to step S2110.

At step S2110, the process of turning off all the second switches SW1-SWn is executed and thereafter, the process returns to the main process of FIG. 15 where the process is ended.

As described above, with the power supply control system 1B according to the third embodiment, it is possible to judge (detect) whether or not the dark-current anomaly is occurring in any of the ECU1-ECU4. Additionally, it is possible to perform the recovery operation from anomaly for the ECU1-ECU4 where the dark-current anomaly has occurred.

Fourth Embodiment

A fourth embodiment will be described with reference to FIGS. 17 to 28.
(Re. Constitutional Example of Power Supply Control System of Fourth Embodiment)

Figure 17:
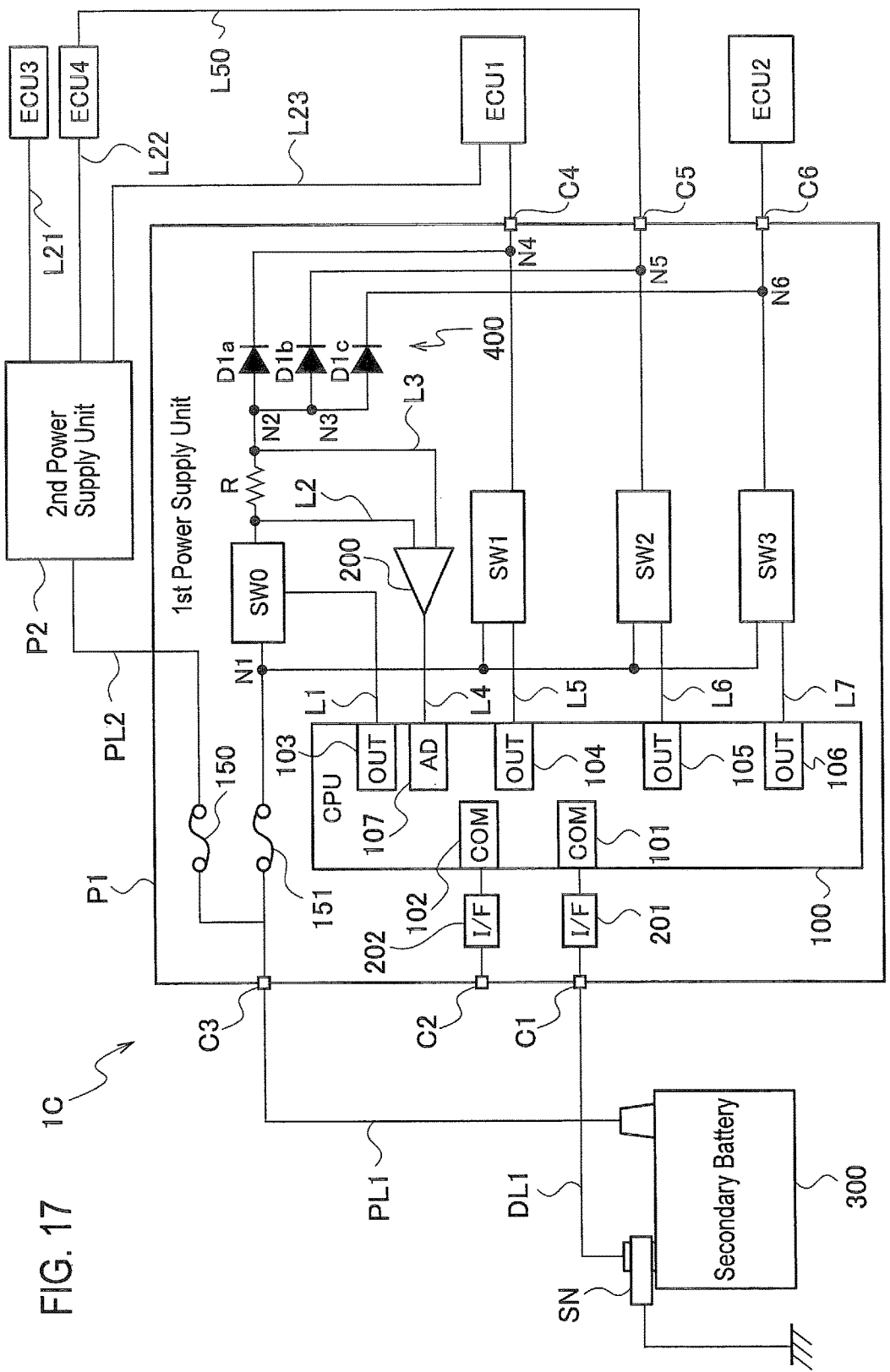
FIG. 17 is a circuit diagram illustrating an example of the circuit constitution of a power supply control system according to a fourth embodiment.

FIG. 17 is a circuit diagram illustrating an example of a circuit construction of a power supply control system 1C according to the fourth embodiment.

The power supply control system 1C according to the fourth embodiment includes: control units (ECU1-ECU4, ECU10, ECU11, etc. which will be referred to as ECU, below) that can change the operation of a plurality of electronic devices (not illustrated, e.g. an on-vehicle watch, a security system, etc.) to an operating state (which is also referred to as "wake state") to control the operation performed by each electronic device and a power saving state (which is also referred to as "sleep state") to stop the control; two or more power supply units (two power supply units (a first power supply unit P1 and a second power supply unit P2) in the fourth embodiment) that supply the respective ECU1-ECU4 with one route or two or more routes driving power; a secondary battery 300 including such as nickel-hydrogen batteries or lithium ion batteries for supplying the respective power units P1, P2 with power; a current sensor SN for detecting charge and discharge currents of the secondary battery 300; and a drive controller (which includes CPU, logic IC, or the like, it will be referred to as "CPU" after) 100 that controls the drive of ECU1-ECU4 and the power supply units P1, P2. Each of the power supply units P1, P2 includes a first switch SW0 for performing the power supply to the ECUs and the second switches SW1-SW3 for performing a classification of the power supply systems for the ECUs.

Additionally, in the first switch SW0 or its vicinity (in the fourth embodiment, between the first switch SW0 and the connectors C4-C6 as illustrated in FIG. 17 etc.), there is a current detection circuit 400 that detects a consumption current of the ECU1-ECU4 flowing through the first switch SW0.

Then, the CPU 100 judges whether the dark-current anomaly has occurred in any of the ECU1-ECU4 on the basis of the detection result of the current detection circuit 400. Additionally, by controlling ON and OFF states of the first switch SW0 and the second switch SW1 to measure a consumption current of each ECU1-ECU4 belonging to the respective power supply systems, the CPU 100 also judges in which of the ECUs (any of the ECU1-ECU 4) the dark-current anomaly has occurred, on the basis of the measurement result.

Here, ON and OFF states of the first switch SW0 and the second switch SW1 in measuring the consumption currents of the ECU1-ECU4 are illustrated with, for example, a table of FIG. 25.

In advance of describing the contents of the tables of FIGS. 25 and 26, the overall constitution of the power supply control system 1C will be described with reference to FIG. 18.
(Re. Overall Constitution of Power Supply Control System of Fourth Embodiment)

Figure 18:
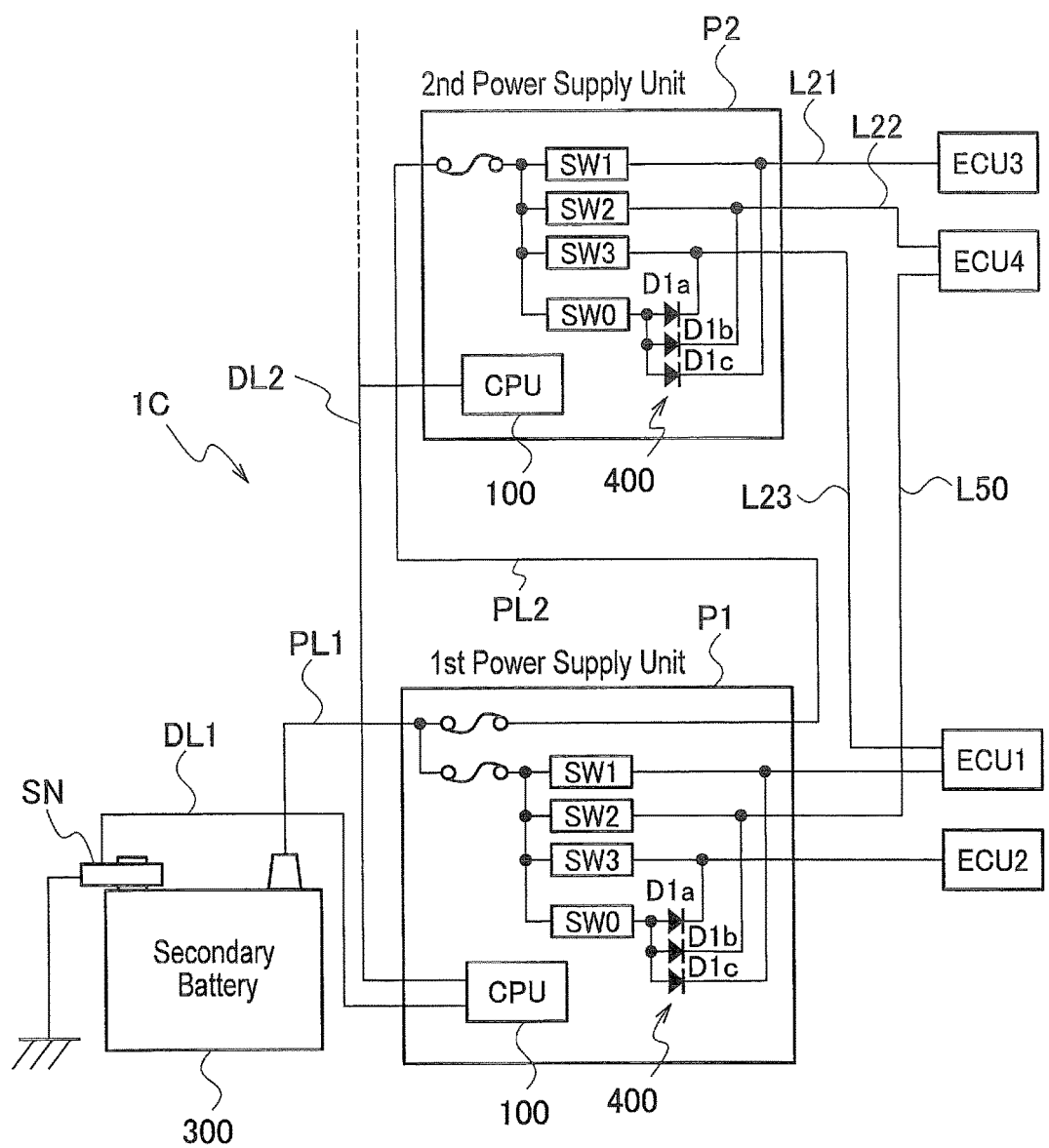
FIG. 18 is a constitutional diagram illustrating an example of the entire constitution of the power supply control system according to the fourth embodiment.

FIG. 18 is a constitutional diagram illustrating an example of the overall constitution of the power supply control system 1C according to the fourth embodiment.

FIG. 18 illustrates an example of the power supply control system 1C including two power supply units P1, P2. Incidentally, the number of power supply units is not limited to two and may be selected by, for example, three or more arbitrary number.

In the example illustrated in FIG. 18, the ECU1, the ECU4, and the ECU2 are respectively connected to the first power supply unit P1.

Further, the ECU3, the ECU4, and the ECU 1 are respectively connected to the second power supply unit P2 through lines L21-L23.

As for the signal system, the current sensor SN and the CPUs 100 in the respective power supply units P1, P2 are connected to each other through data lines DL1, DL2.
(Re. Control Status of ON and OFF States of Switches)

Next, the control status of ON and OFF states of the switches will be described with reference to the tables of FIGS. 25 and 26.

As illustrated with the table of FIG. 25, as for the ECU1, the first power supply unit P1 is controlled so that the switches SW0, SW1, SW2, SW3 exhibit "ON, OFF, ON, ON" states respectively, while the second power supply unit P2 is controlled so that the switches SW0, SW1, SW2, SW3 exhibit "OFF, ON, ON, OFF" states respectively.

Additionally, as for the ECU2, the first power supply unit P1 is controlled so that the switches SW0, SW1, SW2, SW3 exhibit "ON, ON, ON, OFF" states respectively. In the second power supply unit P2, as the ECU2 does not affect the dark current detection consequently, the switches may exhibit either ON state or OFF state.

Additionally, as for the ECU3, the second power supply unit P2 is controlled so that the switches SW0, SW1, SW2, SW3 exhibit "ON, OFF, ON, ON" states respectively. In the first power supply unit P1, as the ECU3 does not affect the dark current detection consequently, the switches may exhibit either ON state or OFF state.

As for the ECU4, the first power supply unit P1 is controlled so that the switches SW0, SW1, SW2, SW3 exhibit "ON, ON, OFF, ON" states respectively, while the second power supply device P2 is controlled so that the switches SW0, SW1, SW2, SW3 exhibit "OFF, ON, OFF, ON" states respectively.

Thus, it is possible to carry out the measurement of consumption current for each ECU1-ECU4 belonging to respective power supply systems without omission and also possible to detect in which of the ECUs the dark-current anomaly has occurred, accurately.

Further, the CPU 100 can control the switching of ON and OFF states in the first switch SW0 or the second switch SW1 so as to interrupt supplying the power to a power supply system where it is judged that the dark-current anomaly has occurred.

Accordingly, an unnecessary supplying the power from the secondary battery 300 is prevented so that it is possible to suppress a wasteful consumption of the secondary battery 300 (so-called "battery exhausting" condition). In the arrangement where the power supply control system 1C according to the fourth embodiment is mounted on a vehicle or the like, therefore, it is possible to suppress the occurrence of such a situation that an engine cannot be started due to the battery exhaustion.

The CPU 100 also can control the switching of ON and OFF states in the first switch SW0 or the second switch SW1 so as to perform the initialization process (power-on reset) for returning an ECU (any of ECU1-ECU4), which belongs to a power supply system where the dark-current anomaly is determined to occur, to the ordinary state.

Here, the control status of ON and OFF states of the first switch SW0 and the second switch SW1 in performing the power-on reset for each ECU1-ECU4 is illustrated with, for example, a table of FIG. 26.

That is, as for the ECU1, the first power supply unit P1 is controlled so that the switches SW0, SW1, SW2, SW3 exhibit "OFF, OFF, ON, ON" states respectively, while the second power supply unit P2 is controlled so that the switches SW0, SW1, SW2, SW3 exhibit "OFF, ON, ON, OFF" states respectively.

Additionally, as for the ECU2, the first power supply unit P1 is controlled so that the switches SW0, SW1, SW2, SW3 exhibit "OFF, ON, ON, OFF" states respectively. In the second power supply unit P2, as the ECU2 does not affect the power-on reset process consequently, the switches may exhibit either ON state or OFF state.

Additionally, as for the ECU3, the second power supply unit P2 is controlled so that the switches SW0, SW1, SW2, SW3 exhibit "OFF, OFF, ON, ON" states respectively. In the first power supply unit P1, as the ECU3 does not affect the power-on reset process consequently, the switches may exhibit either ON state or OFF state.

As for the ECU4, the first power supply unit P1 is controlled so that the switches SW0, SW1, SW2, SW3 exhibit "OFF, ON, OFF, ON" states respectively, while the second power supply unit P2 is controlled so that the switches SW0, SW1, SW2, SW3 exhibit "OFF, ON, OFF, ON" states respectively.

Thus, it is possible to carry out the power-on reset process for each ECU1-ECU4 belonging to respective power supply systems without omission, thereby dissolving the problem of a dark-current anomaly.

Besides, the detailed process procedures related to the detection of a dark-current anomaly will be described with reference to a flowchart, later.

(Re. Concrete Constitutional Example of Power Supply Control System of Fourth Embodiment)

Referring to FIG. 17, a more concrete constitution will be described with the first power supply unit P1 as an example. It is assumed here that the other power supply unit, such as the second power supply unit P2, is also provided with the substantially same constitution.

As illustrated in FIG. 17, the secondary battery 300 is connected to the connector C3 of the first power device P1 through the power line PL1. The power line PL1 is branched inside the power supply unit P1 and further connected to the external second power supply unit P2 through a fuse 150 and a power line PL2.

The first switch SW0 and the second switches SW1-SW3 are connected in parallel with a power line extending from a fuse 151, through a node N1.

The first switch SW0 is constructed so as to ordinarily maintain its ON state and thus energize the respective control units (ECU1-ECU4, etc.). While, with the second switches SW1-SW3 connected to predetermined control units (ECU1-ECU4, etc.), these switches are constructed so as to allow their ON and OFF states to be switched in accordance with various conditions.

The first switch SW0 is connected to a current detection circuit 400 for detecting a current flowing through the first switch SW0.

More specifically, the current detection circuit 400 includes a sense resistor R connected in series to the first switch SW0 and a comparator 200 connected to lines L2, L3 extending from both ends of the sense resistor R. Then, a signal generated from the comparator 200 on the basis of a voltage drop caused by a current flowing through the sense resistor R is inputted to an A/D (analog-digital conversion) terminal 107 of the CPU 100 through a line L4. With this configuration, the above current detection circuit can detect a current flowing through the first switch SW0.

Further, the sense resistor R is connected, on the opposite side of the first switch SW0, to backflow preventing diodes D1a-D1c via nodes N2, N3 and further connected to the ECU1, the ECU2 and the ECU4 via nodes N4-N6 and connectors C4-C6.

More specifically, the ECU1 is connected to the connector C4, while the ECU4 is connected to the connector C5 through a line L50, and the ECU2 is connected to the connector C6.

Incidentally, the second power device P2 is connected to the ECU3, the ECU4, and the ECU1 through lines L21, L22, and L23, respectively.

Thus, in the example illustrated in FIG. 17, the ECU2 and the ECU3 are commonly connected to one route of power supply system (either the power supply unit P1 or the power supply unit P2), while the ECU1 and the ECU4 are commonly connected to two routes of power supply systems (both the power supply unit P1 and the power supply unit P2). In connection, in case of adopting three or more power supply units, three or more routes of power supply systems may be connected to a single ECU.

Further, the second switch SW1 is connected between the node N1 and the node N4. Besides, the second switch SW1 has a control terminal connected to an output terminal 104 for control signals of the CPU 100 through a line L5.

Further, the second switch SW2 is connected between the node N1 and the node N5. Besides, the second switch SW2 has a control terminal connected to an output terminal 105 for the control signals of the CPU 100 through a line L6.

Still further, the second switch SW3 is connected between the node N1 and the node N6. Besides, the second switch SW3 has a control terminal connected to an output terminal 106 for the control signals of the CPU 100 through a line L7.

Further, a current sensor SN is connected to a communication terminal 101 of the CPU 100 through an interface I/F 201, a connector C1, and a data line DL1, thereby allowing the CPU 100 to receive the detection results of charging and discharging currents of the secondary battery 300.

Further, an interface I/F 202, a connector C2, and other external devices (not illustrated) are connected to a communication terminal 102 of the CPU 100.

The concrete example of the operation of the first switch SW0 and the second switches SW1-SW3 will be described with reference to FIGS. 25 and 26.

According to the power control system 1C according to the fourth embodiment, the current sensor SN measures charging and discharging currents of the secondary battery 300, and therefore, the system can detect such a situation that any ECU (any one of the ECU1-ECU4) has not made the transition to a sleep state, by charging and discharging currents during the sleep state.

Further, the CPU 100 of each power supply unit P1, P2 controls the first switch SW0 and the second switches SW1-SW3 to measure the consumption current of each ECU (ECU1-ECU4) connected to each power supply system, thereby allowing to judge in which of the ECUs (ECU1-ECU4) the anomaly has occurred.

Besides, the examples of the control status of the first switch SW0 and the second switches SW1-SW3 are as described above with reference to the table of FIG. 25.

(Re. Constitution of ECU)

Figure 19:
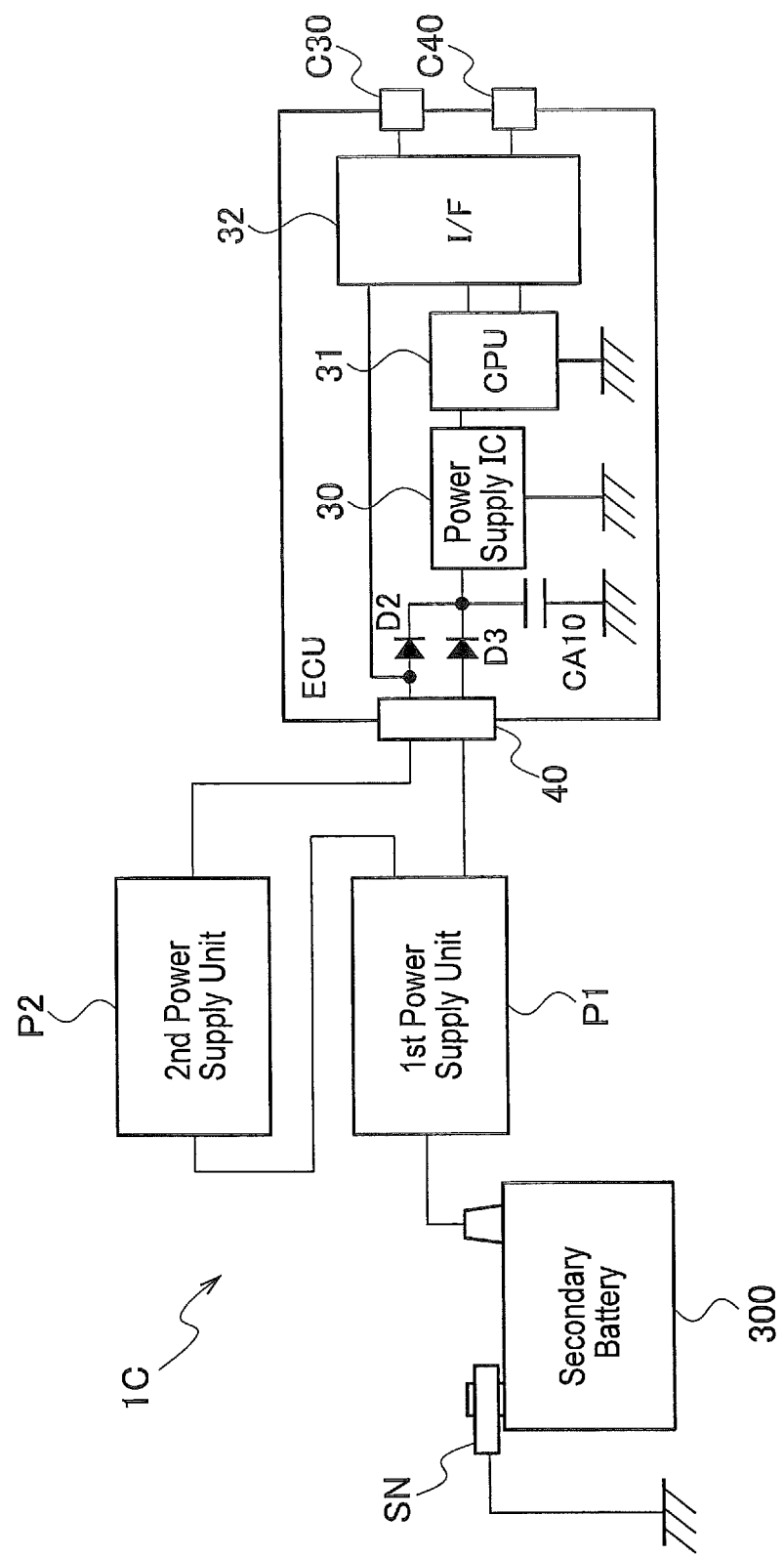
FIG. 19 is a schematic constitutional diagram illustrating the schematic constitution of an ECU constituting a part of the power supply control system according to the fourth embodiment.

FIG. 19 is a schematic constitutional diagram illustrating the schematic constitution of an ECU forming a part of the power supply control system 1C according to the fourth embodiment.

Incidentally, each of the ECU1-ECU4 illustrated in FIGS. 17 and 18 has the similar constitution to the ECU illustrated in FIG. 19.

The ECU includes a connector 40 connected to the first power supply unit P1 or the second power supply unit P2, and connectors C30, C40 connected to various external electronic devices.

The connector 40 is connected to a power supply IC 30 through diodes D2, D3 and a capacitor CA 10.

A CPU 31 that performs various control processes and the like is connected to the power supply IC 30, and also connected to various electronic devices via the interface 32 and the connectors C30, C40.

With the power supply control system 1C according to the fourth embodiment, it is possible to detect even a situation that, in the respective power supply units P1, P2, an anomaly has occurred in an, ECU out of communication. Further, the recovery operation of an ECU from an anomaly can be accomplished by performing the power-on reset on the ECU having the dark-current anomaly.

In the power supply control system 1C according to the fourth embodiment, the ECU1 and ECU4 are supplied with a power from two routes of the power supply systems (both the first power supply unit P1 and the second power supply unit P2) in order to enhance the reliability of supplying the power. Therefore, the detection of a dark-current anomaly is difficult only with each power supply unit P1, P2 confirming only its own power supply system and thus, it is impossible to perform the power-on reset.

Therefore, in the power supply control system 1C according to the fourth embodiment, one of the plurality of power supply units (e.g. the first power supply unit P1 as a main power supply unit) performs the power supply control of the entire vehicle. For example, the first power supply unit P1 grasps not only a power situation of a power supplied from its own unit but also a power situation of the other power supply unit (for example, the second power supply device P2 as a sub power supply unit) and controls also supplying the power of the second power supply unit P2.

That is, the ECU1 and the ECU4 are supplied with the power from the first power supply unit P1 and the second power supply unit P2, and therefore, when performing to measure respective consumption currents (dark currents) of the ECU1 and the ECU4 and implement the power-on reset process, the first power supply unit P1 first stops the operation of the second power supply unit P2 of supplying the power to the target ECUs (i.e. the ECU 1 and the ECU4) and subsequently carries out the power supply process as described above.

Incidentally, the first power supply unit P1 may be configured so as to firstly stop to supply the power to the target ECUs, and subsequently allow the second power supply unit P2 to perform the measurement of a dark current and the implementation of the power-on reset process.

Further, in the power supply control system 1C according to the fourth embodiment, the current sensor SN may be constructed so as to transmit the detection result of charging and discharging currents of the secondary battery 300 to a monitoring device (e.g. an outside server etc.) for monitoring the charging state of the secondary battery 300.

Still further, the system may be constructed so as to activate the power supply units P1, P2 or the control units (the ECU1-ECU4, etc.) through communication when the current sensor SN detects a consumption current larger than a predetermined vehicular dark current.

Alternatively, the ECU1-ECU4, etc. may be constructed so as to inform the power supply units P1, P2 of the occurrence of a dark-current anomaly, provided that the ECU1-ECU4, etc. are activated since the current sensor SN detects a dark-current anomaly.

The power supply units P1, P2 may control ON and OFF states of the first switch SW0 and the second switches SW1-SW3 when receiving a signal indicating the occurrence of a dark-current anomaly.

Additionally, the power supply units P1, P2 or the ECU1-ECU4, etc. may control the current sensor SN so as to shift to the sleep state after executing the power-on reset process.

With the above-mentioned constitution, even when there is a possibility of engine start disability due to a battery exhaustion derived from a long-term parking etc. despite that the dark current is within an ordinary range, it is possible to suppress the occurrence of such a situation by turning off the first switch SW0 and the second switches SW1-SW3.

(Process at Time of Dark-Current Anomaly Occurrence)

An example of the processing procedure of a process at the time of dark-current anomaly occurrence executed by the power supply control system 1C according to the fourth embodiment will be described with reference to flowcharts illustrated in FIGS. 20 to 24 and tables illustrated in FIGS. 25 to 28.

Figure 20:
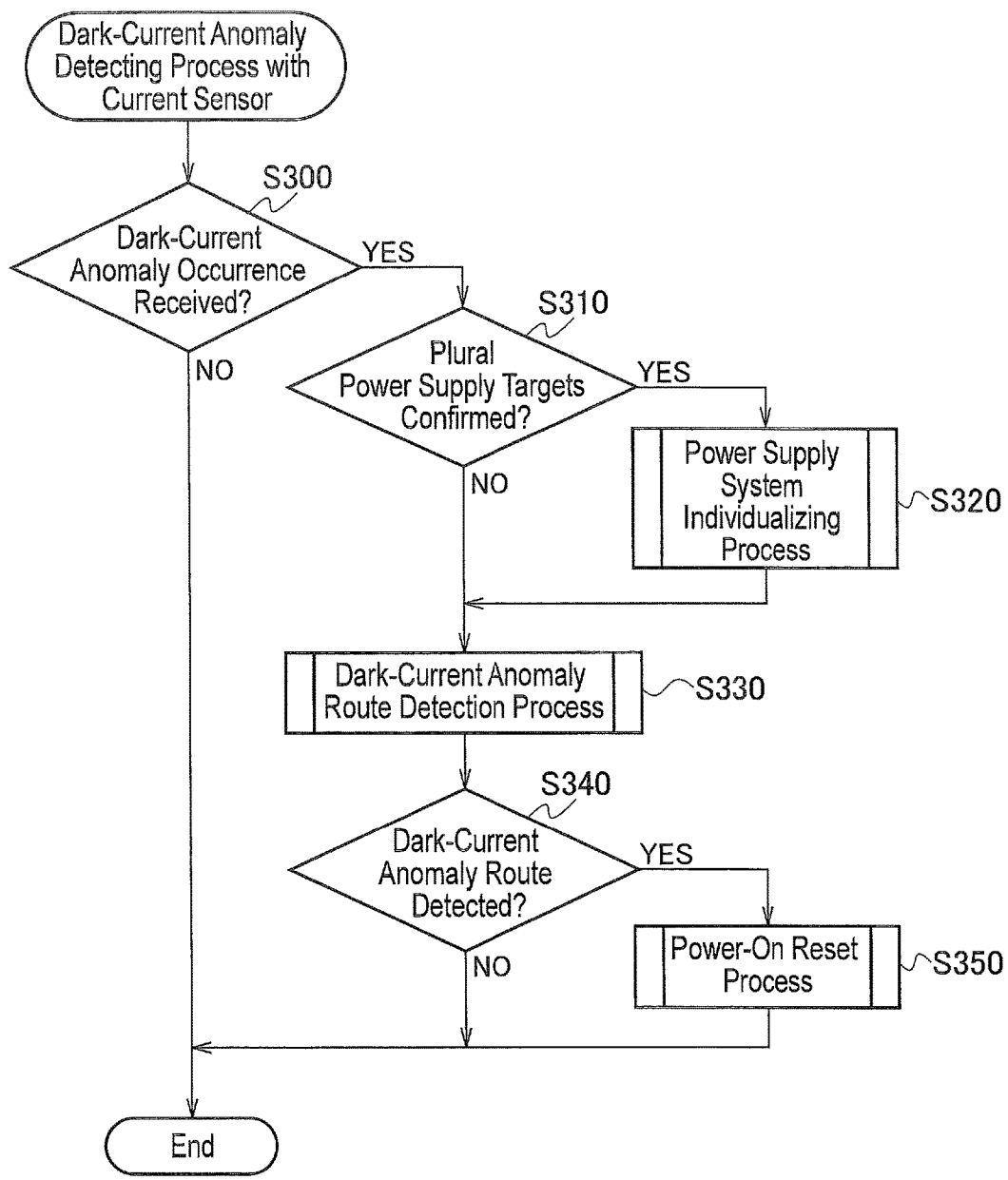
FIG. 20 is a flowchart illustrating an example of the process procedures of a dark-current anomaly detecting process using a current sensor, executed by the power supply control system according to the fourth embodiment.

Here, FIG. 20 is a flowchart illustrating an example of the processing procedure of the process at time of dark-current anomaly occurrence executed by the power supply control system 1C according to the fourth embodiment.

For convenience of explanation, it is assumed that the power supply control system 1C is mounted on a vehicle, and that the process at the time of dark-current anomaly occurrence is executed by the CPU 100 of the first power supply unit P1 illustrated in FIG. 17 etc.

When the process the time of dark-current anomaly occurrence illustrated in the flowchart of FIG. 20 is started, it is firstly executed at step S300 to judge whether or not a signal indicating the occurrence of dark-current anomaly has been received. That is, when the current sensor SN provided in the secondary battery 300 detects a consumption current larger than a preset vehicular dark current (case that the dark-current anomaly has occurred), the detection result is transmitted to the CPU 100 through the data line DL1. Thus, at step S300, it is executed to judge whether or not the CPU 100 has received the detection result's signal (i.e. a signal indicating the occurrence of a dark-current anomaly).

Then, if the result of judgment is "No", then the process is completed without change. While, if the judgment is "Yes", the process goes to step S310.

At step S310, it is judged whether or not a plurality of power supply targets has been confirmed. That is, it is judged whether or not the system has a plurality of power supply systems like the ECU1 and the ECU4 illustrated in FIG. 17 etc..

Then, if the judgment is "Yes", the process goes step S320 where the subroutine of a power supply system individualizing process is performed.

Figure 21:
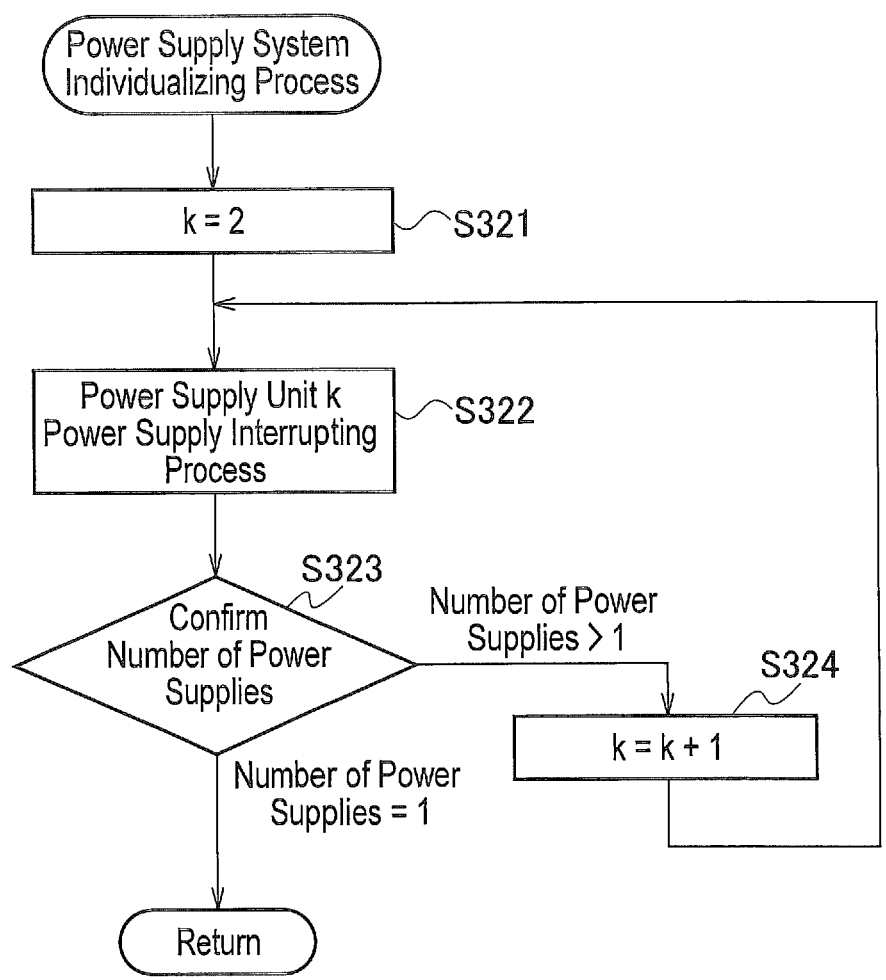
FIG. 21 is a flowchart illustrating an example of the process procedures of a power supply system individualizing process executed by the power supply control system according to the fourth embodiment.

Here, the processing procedure of the power supply system individualizing process will be described with reference to the flowchart of FIG. 21.

ON and OFF states of the respective switches (the first switch SW0 and the second switches SW1-SW3) when measuring a dark current is illustrated with a table of FIG. 25. In connection, the ECU3 connected to the first power supply unit P1 and the ECU2 connected to the second power supply unit P2 may be either one of ON and OFF states because they do not affect the detection results of dark currents consequently.

In the power supply system individualizing process, at step S321, it is firstly executed to set an initial value to k=2 and thereafter, the process goes to step S322.

At step S322, a power supply interrupting process is performed for a power supply unit k (in the fourth embodiment, the second power supply unit P2 corresponding to the equation k=2) and thereafter, the process goes to step S323.

At step S323, a process of confirming the number of power supplies to be supplied is performed. Then, if the number of power supplies is equal to 1, the process returns to the main process of FIG. 20. If the number of power supplies is more than 1, the process goes to step S324 where k is incremented by "1" and the process returns to step S322.

Thus, depending on the number of power supplies, i.e. the number of power supply systems, it is possible to interrupt the power supplies, such as the power supply units P1, P2.

Returning to the flowchart in FIG. 20, if the judgment at step S310 is "No", the processing goes to step S330 where the subroutine of a dark-current anomaly route detection process is executed.

Figure 22:
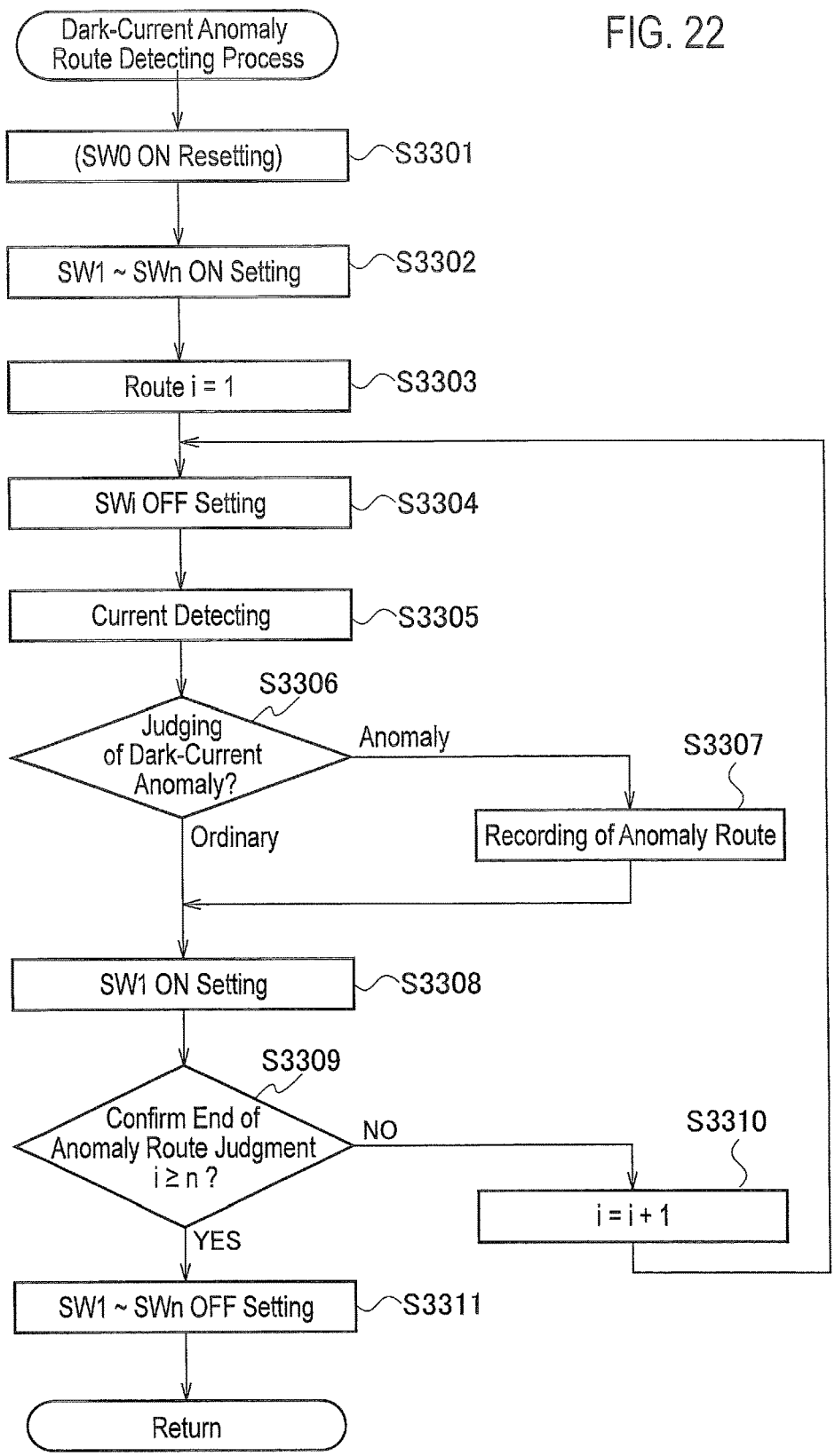
FIG. 22 is a flowchart illustrating an example of the process procedures of a subroutine related to a dark-current anomaly route detecting process in the power supply control system according to the fourth embodiment.

Here, the processing procedure of the dark-current anomaly route detection process will be described with reference to the flowchart of FIG. 22.

Here, the term "dark-current anomaly route" represents a different concept from "power supply system" and thus, it means a route to which an ECU having a dark-current anomaly belong.

Namely, in the first power supply unit P1, there exist "route #1" to which the ECU1 belongs, "route #2" to which the ECU4 belongs, and "route #3" to which the ECU2 belongs.

Similarly, in the second power supply unit P2, it is assumed that there exist "route #1" to which the ECU3 belongs and "route #3" to which the ECU1 belongs.

ON and OFF states of the respective switches (the first switch SW0 and the second switches SW1-SW3) when executing the dark-current anomaly route detection process is illustrated with a table of FIG. 27.

At step S3301, the ON resetting process of turning on the first switch SW0 is performed. Thus, as illustrated in FIG. 27, the switch SW0 is maintained in "ON" state in the dark-current anomaly route detection process for respective routes (routes #1-#3).

Next, at step S3302, the ON setting process of turning on the second switches SW1-SWn (n: an integer; n=3 in the example illustrated in FIG. 17) is executed. Consequently, all of the second switches SW1-SWn are set to the ON states once.

Next, at step S3303, the route number "i" is set to 1 (route i=1) and then the process goes to step S3304.

At step S3304, the OFF setting process of the switch SWi is performed. Thus, in "route #1" of FIG. 27, only the second switch SW1 is turned off, while the other switches, i.e., the first switch SW0 and the second switches SW2, SW3 are turned on.

At step S3305, the current detection process using a detection result by the current detection circuit 400 connected to the first switch SW0 is performed. At next step S3306, the dark-current anomaly judgment process is executed on the basis of the detection result of current. That is, if the detection result by the current detecting circuit 400 exceeds a preset threshold value for dark-current anomaly, the judgment of "anomaly" is afforded. While, if the detection result does not exceed the threshold value, the judgment of "ordinary" is afforded.

Then, in case of the judgment of "anomaly", the process goes to step S3307 where an anomaly route recording process is performed. That is, if it is judged that the route #1 is "anomaly", such information is stored in, for example, a nonvolatile memory (not illustrated) etc. connected to the CPU 100 and the process goes to step S3308.

Alternatively, in case of the judgment of "ordinary" at step S3306, the process goes to step S3308 where the ON setting process of the switch SWi (i.e. SW1) is executed and the process goes to step S3309.

At step S3309, the process of confirming a completion of the anomaly route judgment is performed by judging whether or not an inequality i≥n has been realized. Then, if it is judged that the inequality i≥n has not been realized yet (case of "No"), the process goes to step S3310 where the route number "i" is incremented by "1", and thereafter, the process goes to step S3304. In this way, the processes of steps S3304-S3309 are repeatedly executed until the route number "i" reaches a predetermined number (i=3 in the constitution illustrated in FIG. 17).

That is, as illustrated in FIG. 27, there are sequentially executed one judgment process about the presence/absence of a dark-current anomaly in the "route #2" under condition that only the second switch SW2 is turned off, while the other switches, i.e. the first switch SW0 and the second switches SW1, SW3 are turned on, and another judgment process about presence or absence of a dark-current anomaly in the "route #3" under condition that only the second switch SW3 is turned off, while the other switches, i.e. the first switch SW0 and the second switches SW1, SW2 are turned on.

Consequently, it is possible to detect in which of the routes the dark-current anomaly has occurred, without omission.

On the other hand, if it is judged that the inequality i≥n has been realized (i.e. case of "Yes") at step S3309, the process goes to step S3311 where the process of turning off all the second switches SW1-SWn is executed, and thereafter, the process returns to the main process of FIG. 20.

Returning to the flowchart of FIG. 20, it is executed at step S120 to judge whether or not the dark-current anomaly route has been detected. Then, if it is judged that no dark-current anomaly route has been detected (i.e. case of "No"), the process will be ended. On the other hand, if it is judged that the dark-current anomaly route has been detected (i.e. case of "Yes"), the process goes to step S130 where the subroutine of a power-on reset process is performed.

Figure 23:
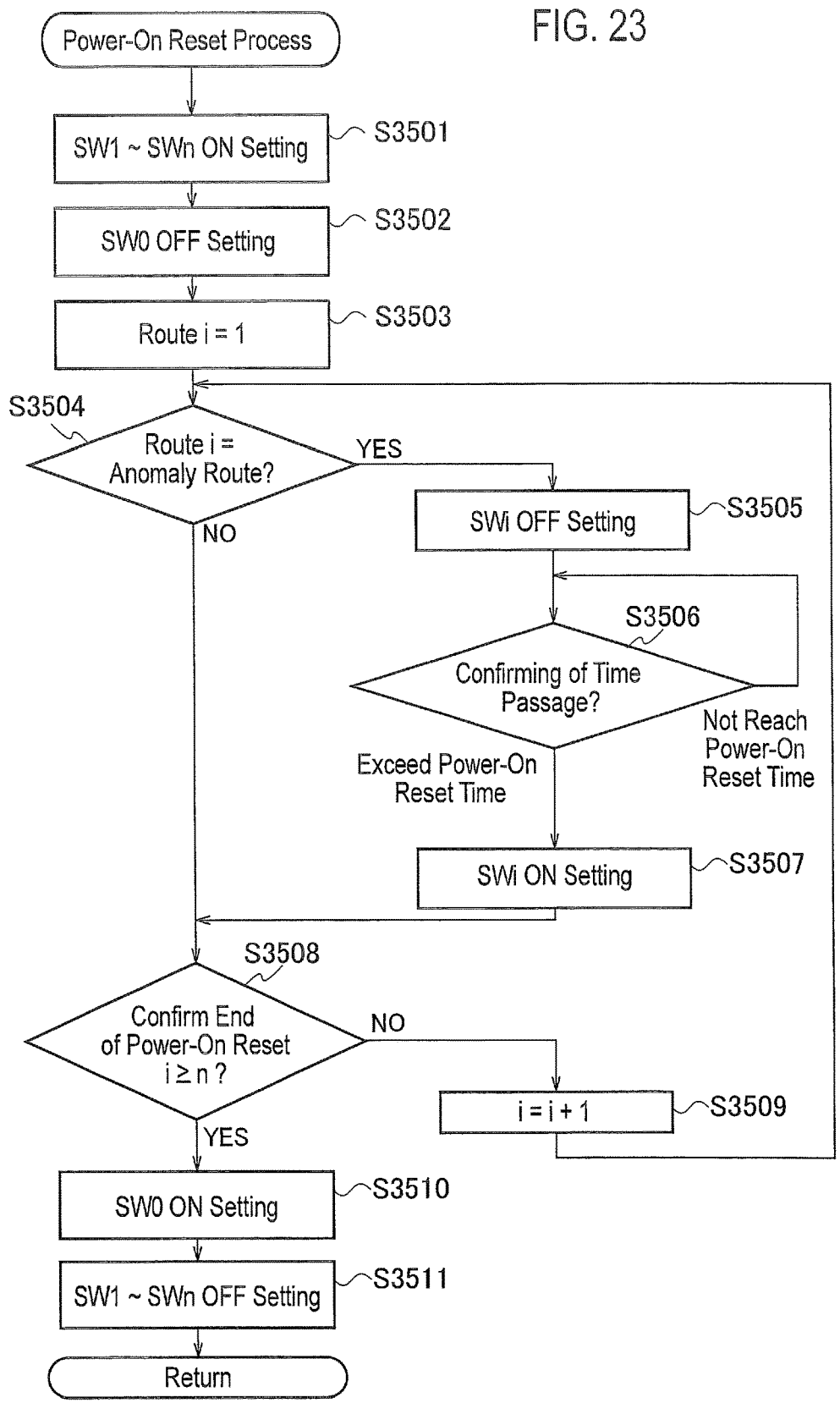
FIG. 23 is a flowchart illustrating an example of the process procedures of a subroutine related to the power-on reset process in the power supply control system according to the fourth embodiment.

Here, the procedure of the power-on reset process will be described with reference to the flowchart of FIG. 23. Incidentally, ON and OFF states of the respective switches (the first switch SW0 and the second switches SW1-SW3) at the execution of the power-on reset process are illustrated with a table of FIG. 28.

At step S3501, the ON setting process of turning on the second switches SW1-SWn (n: an integer; n=3 in the example illustrated in FIG. 17) is performed. Consequently, all of the second switches SW1-SWn are set to the ON states once.

Next, at step S3502, the OFF setting process of turning off the first switch SW0 is executed.

Next, at step S3503, the route number "i" is set to 1 (route i=1) and then the process goes to step S3504.

At step S3504, it is executed to judge whether or not the route i (i.e. the route #1 here) is an anomaly route.

If the judgment result is "No", then the process goes to step S3508. While, if the judgment result is "Yes", then the process goes to step S3505.

At step S3505, the OFF setting process of turning off the switch SWi (i.e. SW1, here) is executed.

Thus, as illustrated in FIG. 28, in the "route #1", the first switch SW0 and the second switch SW1 are turned off, while the second switches SW2, SW3 are turned on.

At step S3506, there is executed a confirming process of the passage of time to judge whether or not a predetermined time (i.e. a power-on reset time) has passed. Here, it is executed to wait ready until time reaches the power-on reset time. Then, if reaching the power-on reset time, the power-on reset process is executed and the process goes to step S3507.

At step S3507, the ON setting process of turning on the switch SWi is performed and thereafter, the process goes to step S3508.

At step S3508, the process of confirming a completion of the power-on reset process is performed by judging whether or not an inequality i≥n has been realized.

Then, if it is judged that the inequality i≥n has not been realized yet (case of "No"), the process goes to step S3509 where the route number "i" is incremented by "1", and thereafter, the process goes to step S3504. In this way, the processes of steps S3504 to S3508 are repeatedly executed until the route number "i" reaches a predetermined number (i=3 in the constitution illustrated in FIG. 17).

That is, as illustrated in FIG. 28, there are sequentially executed one power-on reset process about the "route #2" under condition that the first switch SW0 and the second switch SW2 are turned off, while the second switches SW1, SW3 are turned on, and another power-on reset process about the "route #3" under condition that the first switch SW0 and the second switch SW3 are turned off, while the second switches SW1, SW2 are turned on.

Consequently, it is possible to perform the power-on reset against an ECU belonging to a route where the dark-current anomaly has occurred, without omission.

On the other hand, if it is judged that the inequality i≥n has been realized (i.e. case of "Yes") at step S3508, the process goes to step S3510 where the process of turning on the first switch SW0 is executed and thereafter, the process goes to step S3511.

At step S3511, the process of turning off all the second switches SW1-SWn is executed, and thereafter, the process returns to the main process of FIG. 20 where the process is ended.

Next, the processing procedure of a dark-current anomaly detection process by the power supply unit (e.g. the first power supply unit P1) will be described with reference to the flowchart of FIG. 24.

At step S400, it is judged whether or not a plurality of power supply targets has been confirmed. That is, it is judged whether or not the system has a plurality of power supply systems like the ECU1 and the ECU4 illustrated in FIG. 17 etc..

Then, if the judgment result is "Yes", the process goes to step S410 where the subroutine of the above-mentioned "power supply system" individualizing process is performed and thereafter, the process goes to step S420.

Also, if the judgment result at step S400 is "No", the process goes to step S420.

At step S420, the subroutine of the above-mentioned dark-current anomaly route detection process is executed, and thereafter, the process goes to step S430.

At step S430, it is judged whether or not the dark-current anomaly route has been detected. Then, if it is judged that no dark-current anomaly route has been detected (i.e. case of "No"), the process will be ended. On the other hand, if it is judged that the dark-current anomaly route has been detected (i.e. case of "Yes"), the process goes to step S440 where the subroutine of power-on reset process is performed, and thereafter, the process will be ended.

With the power supply control system 1C according to the fourth embodiment, it is possible to detect even the occurrence of an anomaly in an ECU out of communication.

Further, it is possible to judge that a dark-current anomaly has occurred in any of the ECUs, on the basis of a current value for each route.

Further, for an ECU having a dark-current anomaly, it is possible to perform the anomaly recovery operation by the power-on reset process.

Additionally, as the occurrence of an anomaly can be detected by a difference in current value corresponding to presence or absence of a dark-current anomaly, there is no need of enhancing the accuracy of detecting a current value, thereby eliminating the possibility of increasing the production cost.

Furthermore, for an ECU supplied with power through a plurality of power supply systems, it is possible to detect the occurrence of a dark-current anomaly with high accuracy.

For an ECU supplied with power through a plurality of power supply systems, it is possible to perform the anomaly recovery operation by the power-on reset process effectively.

Although the power supply control system 1C according to the fourth embodiment has been described as above, constituents of each part of the system may be replaced by arbitrary constituents having similar functions.

For instance, the system may be constructed so as to eliminate the current sensor SN for detecting charging and discharging currents of the secondary battery 300 as illustrated in FIGS. 17 to 19.

In the so-constructed power supply control system, the detection of a dark-current anomaly detection could be accomplished with use of the current detection circuit 400 when a predetermined time period has elapsed after, for example, the transition of the power supply units P1, P2 etc. to the sleep state.

Figure 24:
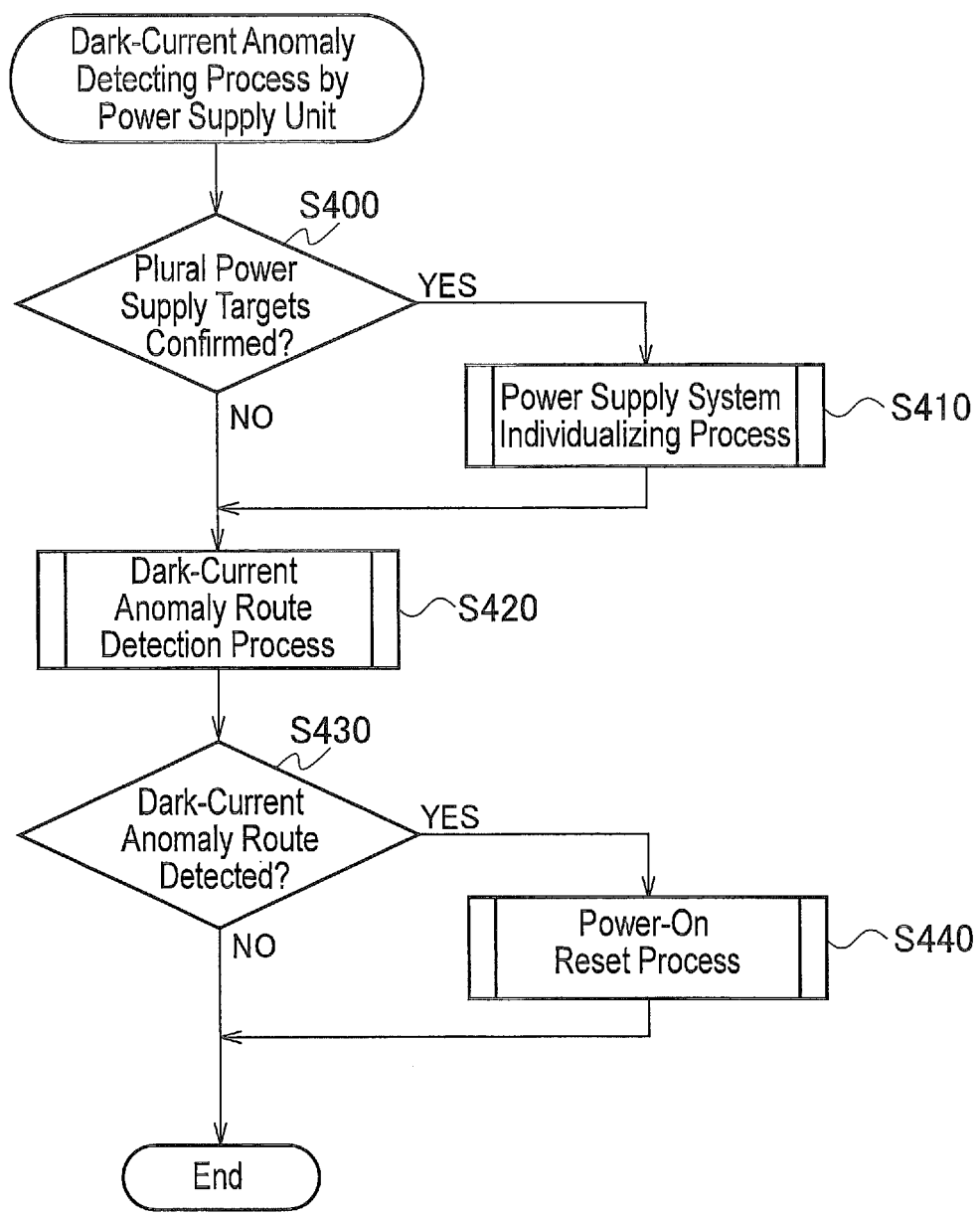
FIG. 24 is a flowchart illustrating an example of the process procedures of the dark-current anomaly detecting process by a power unit, executed by the power supply control system according to the fourth embodiment.

The processing procedure in the above case may be carried out in accordance with, for example, the flowchart of FIG. 24 described above.

What is claimed is:

1. A power supply control system of a controller for controlling supplying a power from a power supply to a load, comprising:
   a power supply line which is connected to the power supply and through which a current flows with supplying the power to the controller;
   a bypass switch which is arranged on the power supply line and which allows supplying the power from the power supply line to the controller to be interrupted by turning-off of the bypass switch;
   a current measuring unit which is provided on the power supply line to be closer to the controller than the bypass switch and which can measure a current flowing through the power supply line during turning-on of the bypass switch with use of a shunt resistor;
   a current supply line which is branched from the power supply line between the power supply and the bypass switch and which is connected to the controller to form a circuit in parallel with the bypass switch and the shunt resistor;
   a current supply switch which is provided on the current supply line and which allows supplying the power from the current supply line to the controller to be interrupted by turning-off of the current supply switch; and
   an anomaly judgment unit configured, in a system-off mode where the controller is to make the transition to a power saving state after stopping supplying the power to the load, so as to judge an anomaly in the transition of the controller to the power saving state from a variation of the current that the current measuring unit measures when turning on or off the current supply switch while keeping the turning-on of the bypass switch, the controller being connected to the current supply line including the current supply switch.

2. The power supply control system of claim 1, wherein
   there are provided a plurality of controllers for the controller and plural sets of combinations each comprising the current supply line and the current supply switch, corresponding to the controllers, and
   the anomaly judgment unit is configured so as to sequentially judge, in the system-off mode, anomaly in the transition of the controllers to the power saving state by sequentially turning on the current supply switches in respective sets while keeping the turning-on of the bypass switch.

* * * * *